(12) United States Patent
Swan

(10) Patent No.: US 9,706,756 B2
(45) Date of Patent: Jul. 18, 2017

(54) ANIMAL MOVEMENT MAPPING AND MOVEMENT PREDICTION METHOD AND DEVICE

(71) Applicant: Michael W. Swan, Green Bay, WI (US)

(72) Inventor: Michael W. Swan, Green Bay, WI (US)

( * ) Notice: Subject to any disclaimer, the term of this patent is extended or adjusted under 35 U.S.C. 154(b) by 20 days.

(21) Appl. No.: 14/657,424

(22) Filed: Mar. 13, 2015

(65) Prior Publication Data

US 2016/0262355 A1     Sep. 15, 2016

(51) Int. Cl.
*A01K 29/00* (2006.01)

(52) U.S. Cl.
CPC .................................. *A01K 29/005* (2013.01)

(58) Field of Classification Search
CPC .. A01K 29/005; A01K 11/006; A01K 11/004; A01M 31/002
USPC .................................... 340/573, 573.2, 573.3
See application file for complete search history.

(56) References Cited

U.S. PATENT DOCUMENTS

| | | |
|---|---|---|
| 2,663,282 A | 12/1953 | Ingle |
| 3,100,473 A | 8/1963 | Kissel |
| 3,100,476 A | 8/1963 | Kissel |
| 3,304,911 A * | 2/1967 | Hakata ................. A61B 5/1105 119/421 |
| 5,514,201 A | 5/1996 | Marijuan De Santiago et al. |
| 7,079,027 B2 | 7/2006 | Wojcik |
| 7,319,383 B2 * | 1/2008 | Howard ................. G01S 17/00 340/531 |
| 8,085,309 B1 * | 12/2011 | Kelliher ................. G01S 19/19 348/143 |
| 2002/0057340 A1 * | 5/2002 | Fernandez ....... G08B 13/19608 348/143 |
| 2011/0102154 A1 * | 5/2011 | Hindhede ............ A01K 29/005 340/10.1 |
| 2012/0085288 A1 | 4/2012 | Salinas et al. |
| 2014/0129075 A1 * | 5/2014 | Carleton ............... B60W 30/00 701/27 |

* cited by examiner

*Primary Examiner* — Qutbuddin Ghulamali
(74) *Attorney, Agent, or Firm* — Taylor IP, P.C.

(57) ABSTRACT

An animal movement prediction method including the steps of establishing, receiving and predicting. The establishing step establishes a wireless mesh network of a plurality of remote sensors. Each sensor is established in the wireless mesh network by installing said sensor on an object to detect the animal in a detection zone; activating the sensor; and capturing a geographic coordinate in a mobile device for at least a portion of the detection zone apart from the sensor. The receiving step receives animal detection information from the sensors by way of the mesh network. The animal detection information includes a time of detection. The predicting step predicts the future movements of animals dependent upon the animal detection information.

20 Claims, 6 Drawing Sheets

The best time to see deer at this sensor is 1.2 hours each side of dawn with the most activity 5 minutes before dawn (-.08 hours).

Time and Wind Correlation Note the correlation on the graph: N and NW wind at dawn highest correlation.

Probability = 76% (47 of 61) The best time to hunt at this sensor is at dawn with a N or NW wind.

ANIMAL MOVEMENT MAPPING AND MOVEMENT PREDICTION METHOD AND DEVICE

BACKGROUND OF THE INVENTION

1. Field of the Invention

The present invention relates to an animal tracking system, and, more particularly, to a deer movement analysis system.

2. Description of the Related Art

Deer hunters need to know not only where the game travels but also its traveling habits in regard to time. While some game may be stalked, the hunter, particularly if using limited range weapons such as a bow and arrow, generally has to wait for the game to come to him.

An effective method of hunting deer is to take a somewhat hidden position, generally elevated in a tree, along a path known to be traveled by the deer. The deer hunter takes a position ten or twenty feet in the air, but even with the best equipment, it is not pleasant to resist the coldest weather for more than a few hours. Additionally the hunter must remain substantially still for fear of being seen by the deer. Often the sport can be unrewarding unless the hunter's timing is right.

It is important that hunters not only know where the deer pass, but also at what time of the day they pass a particular location. The timing of the hunter depended upon mere guesswork or clues located along the trail. Deer are creatures of habit and tend to follow the same trail at approximately the same time each day. If the deer started their day close to the tree stand, it might pass there early in the morning. Conversely, if the deer started very far from this tree stand, it might not arrive there until evening.

The difficulties described above with respect to hunting deer are typical problems encountered with other game as well. The signs at the location will readily tell the hunter what type of animal passed that point.

In addition, it is of great interest to naturalists to study the habits of animals. While devices have been developed for studying animals in captivity, there is a great need for devices to study the time related habits of animals in the wild. There is a particular need to provide devices which will not upset the natural habits of game, yet allow detailed and accurate study of their time related habits.

Devices to study animals have been developed, including U.S. Pat. No. 3,304,911, to Hiroshi Hakatta et al., which describes an apparatus for automatically measuring the movement of an animal, within a defined area using an electric eye system. U.S. Pat. No. 3,100,473 to J. W. Kissel, describes an apparatus for measuring animal activity within a movable, cylindrical container. U.S. Pat. No. 2,663,282 to Ingle, describes a fatigue machine for rats.

None of the prior art described hereinabove satisfies the needs of determining the movement habits of animals in the wild.

What is needed in the art is a system for determining the traveling habits of animals in the wild without interfering with their natural activities.

SUMMARY OF THE INVENTION

The present invention provides a method and system for detecting the movement of animals and predicting their future movement dependent upon predicted environmental conditions.

The invention in one form is directed to an animal movement prediction method including the steps of establishing, receiving and predicting. The establishing step establishes a wireless mesh network of a plurality of remote sensors. Each sensor is established in the wireless mesh network by installing said sensor on an object to detect the animal in a detection zone; activating the sensor; and capturing a geographic coordinate in a mobile device for at least a portion of the detection zone apart from the sensor. The receiving step receives animal detection information from the sensors by way of the mesh network. The animal detection information includes a time of detection. The predicting step predicts the future movements of animals dependent upon the animal detection information.

The invention in another form is directed to an animal movement prediction method including the steps of: receiving animal detection information from sensors, each reception defining an animal detection event; associating a plurality of indicators with each animal detection event thereby creating a snapshot of information; saving the snapshot of information; and predicting future movements of animals dependent upon the snapshots of information and predicted future environmental conditions.

An advantage of the present invention is that it considers future environmental conditions and how past similar conditions caused deer to move.

Another advantage is that the present invention uses low cost passive infrared sensors.

Yet another advantage is that the present invention enhances the probability of a successful hunt for the hunter using it.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
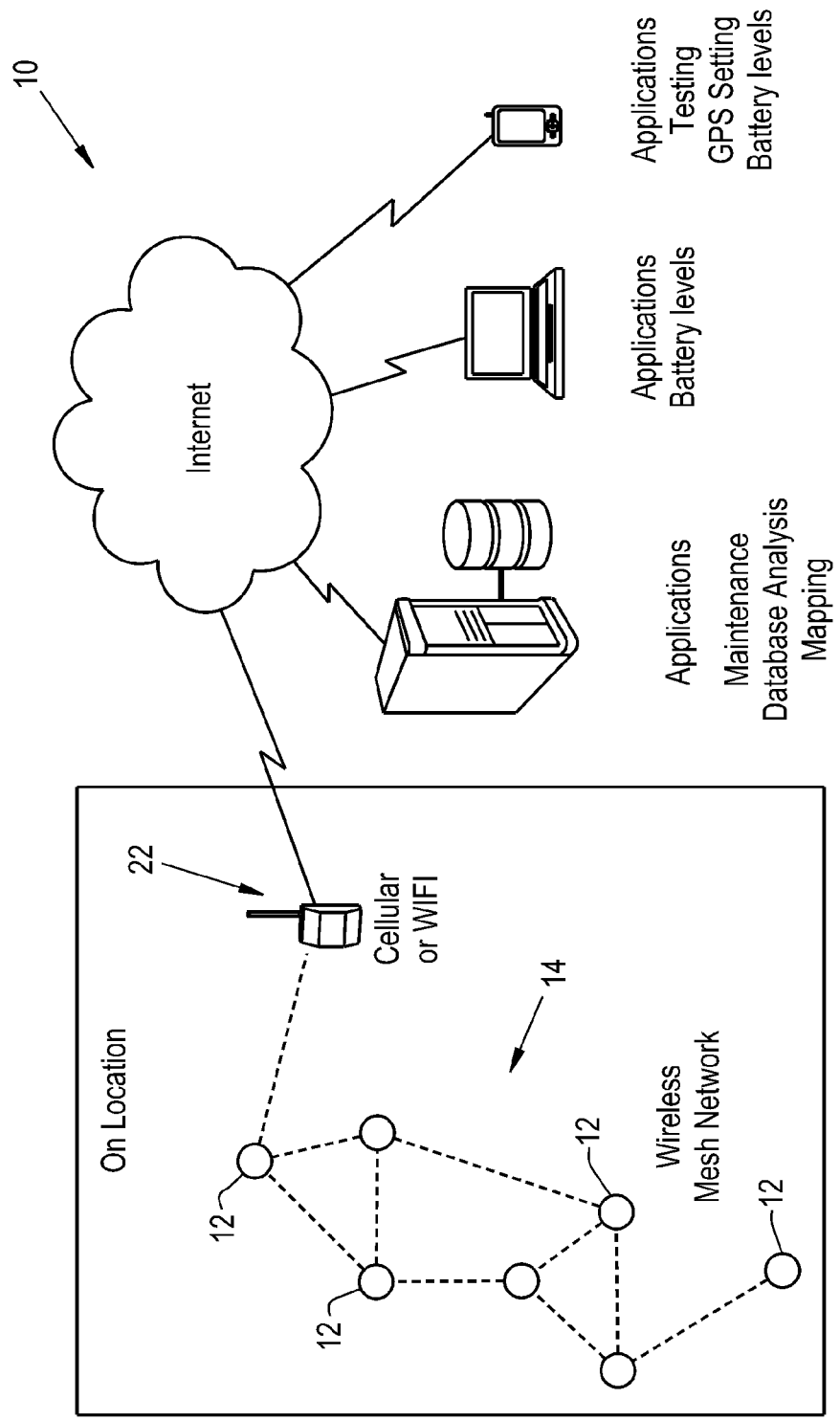
FIG. 1 is a schematical illustration of an embodiment of a deer movement prediction system of the present invention.

Referring now to the drawings, and more particularly to FIG. 1, there is shown an animal movement prediction system referred herein as the DeerMapper system 10 that automatically detects live deer movement events by way of multiple sensors in a wireless mesh network 14 that transmits information about these events to an online database for statistical analysis, mapping and prediction. Although deer is used herein as the example of the animal being studied, it is also contemplated that other animals can be studied using the inventive system described herein.

The sensors have one simple purpose, which is to capture every movement event within their detection range. This is done without lights or moving parts. The sensors are low cost, reliable and simple to set up with little to no ongoing maintenance. Each single-purposed sensor is small, silent, invisible to the deer and long lasting. DeerMapper's strength is in this simplicity multiplied over many sensors and thousands of events, expanded with automated Internet research into a sophisticated data structure from which extensive statistical analysis is done. The results are easy to understand and highly reliable for predicting future deer movements. No prior art system exists that enables extensive research into when and why deer move from one location to another.

Modern hunting practice is to sit along trails waiting for deer instead of participating in organized deer drives. This modern style of hunting requires that the hunter pattern deer habits to predict which trail gives the hunter the best probability of success with minimum time on the tree stand. This provides a particular challenge for hunters whose land is too far away to scout with sufficient frequency to be able to predict the optimal time and place to sit.

DeerMapper 10 provides the answers as to why deer move from one location to another. The base element, which defines and predicts these movements is a statistical snapshot of natural factors, calculated influences, action triggers and outside influences. Frequency distributions of these snapshots are then used to clearly illustrate the cause for deer movements. In addition, that illustration, when compared to the conditions of a future event, will validate the probability of movement at that future event's time and place.

For the user of the inventive system, the veracity of DeerMapper 10 is continually refined by increasing the number of sensors and the length of time they are active at the location. This ever increasing data becomes invaluable when shared among multiple neighboring landowners or used in aggregate by biologists and Departments of Natural Resources by continually providing a basis for new studies into the factors, influences and triggers that motivate deer to move from one location to another.

Terms Used in FIG. 1 and Elsewhere

On Location: On location represents the user's plot of land where users wish to capture and analyze deer movements.
Network: The sensors, placed on the best trails throughout the acreage, communicate with each other and to a gateway 22 to form a Wireless Sensor Network (WSN). This network is designed in a full mesh topology for better reliability, longer end-to-end range, lower data rates, lower power levels and extended battery life of one year. This mesh network 14 topology (hierarchy) incorporates an extra set of communication features such as authentication and encryption, in the upper layer application services, to further strengthen the association between sensors.
  As new sensors are added or sensors are moved to a new location, the network automatically reconfigures itself to establish the best routes by many-to-one aggregated routing. This full mesh network 14 can handle hundreds of sensors and dozens of hops.
  At any time by way of a PC, tablet or phone app, the user can read the RSSI (Received Signal Strength Indicator) and LQI (Link Quality Indicator) of each sensor and gateway 22 to show the current signal strength and quality of each node on the network.
  Requirements:
  The range of the sensor must be at least one half mile taking into account barriers of trees, leaves, buildings and hills.
  The sensor range is rated at six miles (line of sight) with machine-to-machine (M2M) mesh capability to allow multiple hops to cover even longer distances. This longer distance, measured in miles, makes DeerMapper 10 unique by being able to cover a user's large acreage in remote areas.
  The network topology is part of, but not limited to, the 802.15.4 ZigBee Alliance at 900 MHz and 250-750 mW of output power for extended range and reliability.
  Sleep mode, small data size and lower data rates extend battery life.
Internet: Using a phone app, tablet or PC the user logs into a web application to set up and test the sensors and gateway 22. This Internet login will also provide access to the DeerMapper 10 maintenance, database analysis, mapping, prediction and gaming web applications (note the section below titled 'Gaming').
Sensor: The sensor (node) captures then transmits event data to the gateway 22. The DeerMapper 10 sensor technology includes, but is not limited to, passive infrared (PIR) for detection of deer movement. The information determined includes the time of detection, direction and speed of travel, distance from the sensor and size of the animal. The size criteria is used in the analysis to differentiate between deer and smaller animals such as raccoons, foxes, coyotes or turkeys.
  The sensors are equipped with a choice of changeable camouflage covers. These textured covers are designed to blend into tree trunks of oak, maple, pine, beech, ash, poplar or birch. These textured covers camouflage the sensors to look very much like a knot on a tree.
  The effectiveness of these covers can make it difficult to find the sensors. To overcome this issue the DeerMapper phone app comes with a sensor locate functionality. The app marks the location of the user, gateway 22 and each sensor registered to that user on a live map, making it easy for the user to walk directly to the sensor of their choice.
  The camouflaged cover is designed to fit all antenna types (regular, dipole or high-gain). The antenna choice is dependent on the optimal distance needed between sensors for the location. The high-gain antenna will reach ranges four to five times further between sensors but with additional cost.
  Requirements:
  The sensor has extended battery life of one year, low cost, small size, no lights or buttons, and is testable and controllable by way of the phone app or computer.
  The sensors maintain high level security and encryption to eliminate interference from neighboring networks.
  DeerMapper 10 has a built in antenna for a range of one mile between sensors. To extend the range up to 28 miles there are two additional options, dipole or high-gain available.
Event Data: A movement event is triggered when a deer enters the detection zone 18 of a sensor 12. The event data transmitted will include the sensor ID, battery level, RSSI (Received Signal Strength Indicator), LQI (Link Quality Indicator), event date/time, pixels, animal size, distance from sensor 12 and direction of travel.

Gateway: The gateway 22 receives event data from sensors 12, then transmits, by way of cellular or WIFI, the event data to the internet database. When WIFI or cellular is available the gateway 22 has two-way interaction as a link between sensors 12 and the database.

Figure 2:
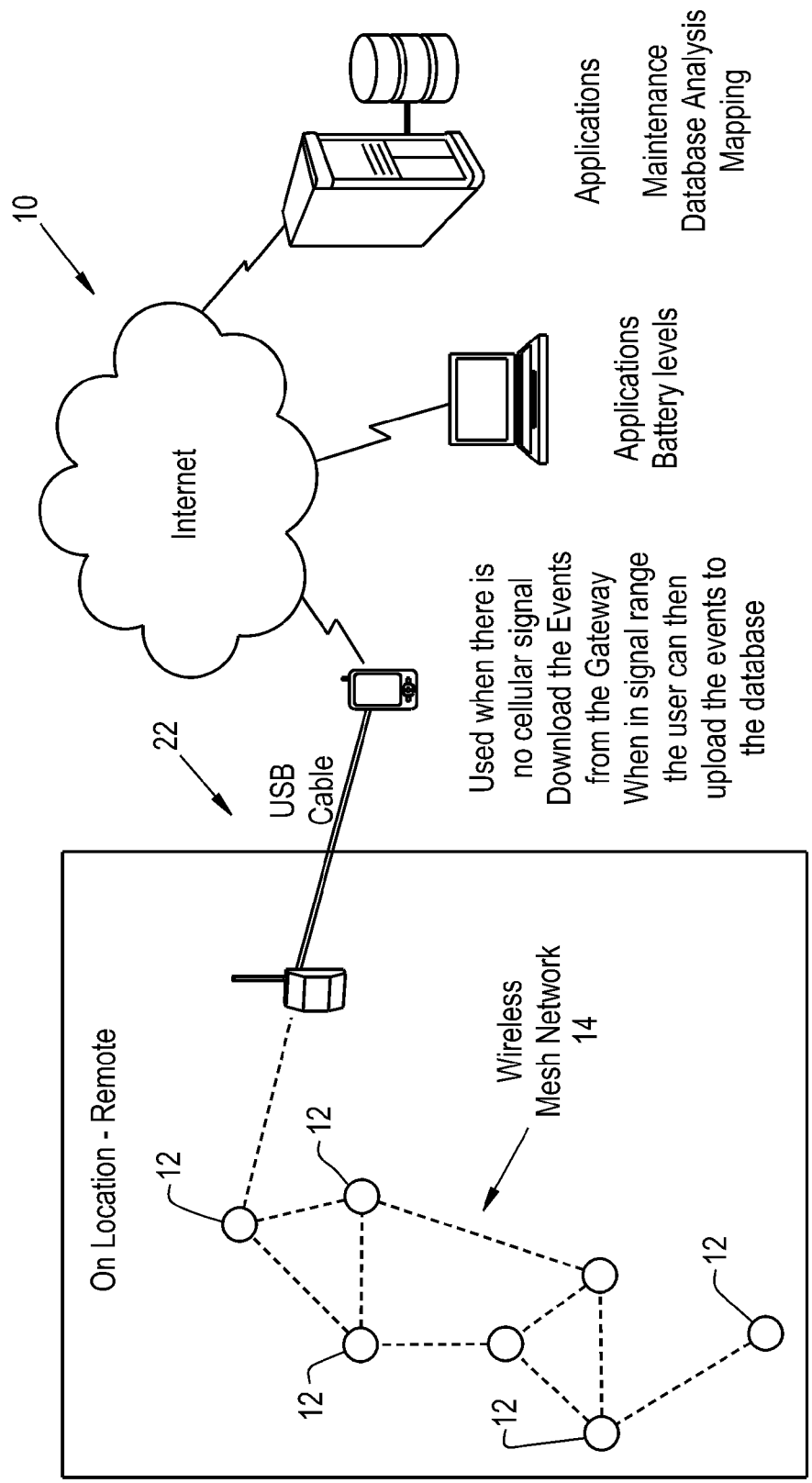
FIG. 2 is another schematical illustration of another embodiment of the deer movement prediction system of the present invention.

The exception is when the gateway 22 transmission frequency is set to 'as needed' for use in remote areas with no available cellular or WIFI signal. In this mode the events will be stored until the user goes to the gateway 22 to do a direct download. The user will connect a mobile phone, PC or tablet with a USB cable to the gateway 22 then download the events. In this scenario it is best to place the gateway 22 close to a road or in a building for easy access without disturbing the deer. See FIG. 2, to illustrate the present invention when the location does not have sufficient cellular signal or WIFI access.

Simple text messaging of less than fifty bytes per event requires minimal cellular signal strength, signal quality and battery power. This feature of the present invention allows a greatly expanded range of DeerMapper 10 usage to remote areas where wireless trail cameras cannot function.

The gateway 22 is part of a DeerMapper 10 pre-registered cellular subscription, so the user has no need to purchase a SIM card nor set up an account with a phone company. DeerMapper 10 uses agreements with multiple cellular services to provide the user the service that has the strongest signal in the selected location. The user needs only one gateway 22 to handle all of their sensors unlike wireless trail cameras, which require separate cellular plans for each camera.

The gateway 22 can be placed indoors to protect it from outdoor elements and have access to power to eliminate reliance on batteries. If WIFI is available, the user can choose between cellular or WIFI connection service.

Requirements: The gateway is testable and controllable by the phone app or computer.

is low cost.

features extended battery life of one year with a sleep mode option.

is as small as possible with no lights or buttons.

offers optional power plug-in capability and WIFI has four options for transmission frequency live hourly daily as needed stores events until they are downloaded by one of three methods cellular transmission WIFI transmission direct cable download (used if the transmission frequency is set to 'as needed')

App: The user can access the sensors and the gateway 22 with the DeerMapper 10 phone app to do the registration, set-up and testing of the sensors and the gateway 22.

change the transmission frequency for the sensors and the gateway 22 to live, hourly, daily or as needed.

check the battery levels of the sensors and the gateway 22.

check RSSI (Received Signal Strength Indicator) of the sensors and gateway 22.

check LQI (Link Quality Indicator) of the sensors and gateway 22.

Requirements: The app will run on both the iPhone and Android.

take panoramic pictures at sensor sites for viewing with the 360 degree viewer.

do analysis, mapping, prediction and gaming.

download the events from the gateway 22 by way of cable and then, with cellular signal or WIFI, upload the events into the online database.

locate a registered sensor 12 or gateway 22 by way of a live map interface.

Database: The online database contains account, event, sensor data and gateway 22 data from which to do the analysis by login name. Supporting tables include natural factors, calculated influences, action triggers, and outside influences, rutting phases and moon phases.

As each event data record is transferred into the database, DeerMapper 10 will add the GPS location from the sensor file and the matching weather information from the Internet.

Partnering trail camera companies can set up their wireless cameras to do live transmission of their pictures directly into the DeerMapper online database. The image is treated as supplemental data as DeerMapper 10 cannot control its accuracy nor completeness. The image data is not be included in the statistical analysis.

Analysis: The online user is provided control of their gateway 22 and sensors from a mobile device 16, such as a mobile phone, tablet or PC. The user has access to deer movement analysis, prediction analysis and mapping of the events represented by their account in addition to information from online sources that augments and is analyzed with the sensor data.

Registration: A new user must first set up an account on the DeerMapper web site. Once an account is established, they will register their sensors 12 and gateway 22 under that account.

This registration will ensure that . . .

the sensor 12 setup, testing and data collection will only work with the sensors 12 and gateway 22 registered under that user account.

if a sensor 12 or gateway 22 is stolen it cannot be set up without the user account login that matches the registration.

the registered user has access to DeerMapper technical support, repairs and exchange services.

the DeerMapper support service includes online access to the registered user's sensors 12, gateway 22 and database for maintenance only if the registered user allows access.

the registration process with the government is complete for both the cellular and network PCS rules (Personal Communications Services).

Gaming: The purpose of DeerMapper gaming is to provide income, education and fun for gamers, location owners, hunting camps, sport shows and retailers. The DeerMapper game is not a simulation. The game is in real time, with live deer in their natural setting. There is no human presence required at the location so the deer are not disturbed, chased or shot at.

Location owners can earn income from DeerMapper 10 by registering their location as one available for gaming. To qualify, the owner's location must have at least ten sensors with a minimum of three months of event history. The owner will set up morning or evening gamer hunts using a set of selected sensor sites. To protect the privacy of the owner and location, only the location's state is specified, without any GPS data.

The DeerMapper gamer's experience is similar to the Fantasy Football gamer's experience in that they are both played real time, under live conditions, where the gamers do not know for sure what will happen, until it happens. They are both games. The better the understanding of the game (hunt), the players (deer) and game scenarios (conditions), the higher the odds of winning. Also like Fantasy Football, DeerMapper games are educational and provide a sense of anticipation.

To play DeerMapper, gamers select a hunt, study its event history, choose the best sensor site and make their bid. The players with the best odds are those who understand why the deer move under the conditions presented in the hunt. Since the hunts are in real time and live, conditions are subject to change, so the bids are also changeable at specified times during the hunt.

The player's score is determined by the number of individual deer, groups of deer, and quality of deer that move past their selected sensor 12. If an optional wireless deer camera is included in the game, it is the responsibility of the owner to close the hunt by entering the picture scores, which rate the size of the bucks at the end of the game. DeerMapper will automatically score the hunt, then pay out the winners and owners.

The DeerMapper mobile phone app provides the owner with the ability to take panorama style pictures at each sensor site. From the DeerMapper web site, the owner will be able to edit those pictures by adding compass-direction readings, weather data, live statistics, trails and distance markings. The gamer can then monitor the game, real time, using the 360 degree picture viewer included on the game site. No identifying site information will be visible to them.

What makes DeerMapper gaming so interesting to play is that the deer are real and they alone decide when they get up and move. Because they are creatures of habit, their behavior can be patterned. However, the factors that determine those repetitive patterns are the complex social effects of their herd, food and water availability, weather and seasonal changes, rut phases and intruders. Deer remain continually alert and have incredible senses for detecting danger, sounds, smells and movements. They communicate with each other through sounds, scent trails and body positioning, among other things. Many factors can interrupt their normal patterns. Therefore, what may seem easy to the lucky hunter is in reality very complex. It is DeerMapper's inclusion of comprehensive behavioral influence that makes the game challenging, educational and exciting.

Certification: DeerMapper certification enhances the value of hunting land by making available the analysis of deer movement activity on the land. This gives the landowner, deer camp and realtor an added sales benefit when leasing or selling the land for whitetail hunting. The requirements for DeerMapper certification is at two levels:

Silver Seal: The DeerMapper system is installed and available.

Gold Seal: The DeerMapper service has been in operation at least one full season.

The owner will receive a personalized registered seal to print and be available to place on their website, sales literature or lease agreement.

Leased Land Services:

The DeerMapper website has a service for landowners, deer camps and realtors to list their hunting land for sale or lease. Landowners and realtors who have a DeerMapper certification will list their land with the personalized seal as part of their listing and be listed separately as they provide an new value for the prospects to actually login to the land's DeerMapper data and do analysis on the deer herd before they buy. Also, the DeerMapper system helps the hunter locate deer on their new hunting land.

Figure 3:
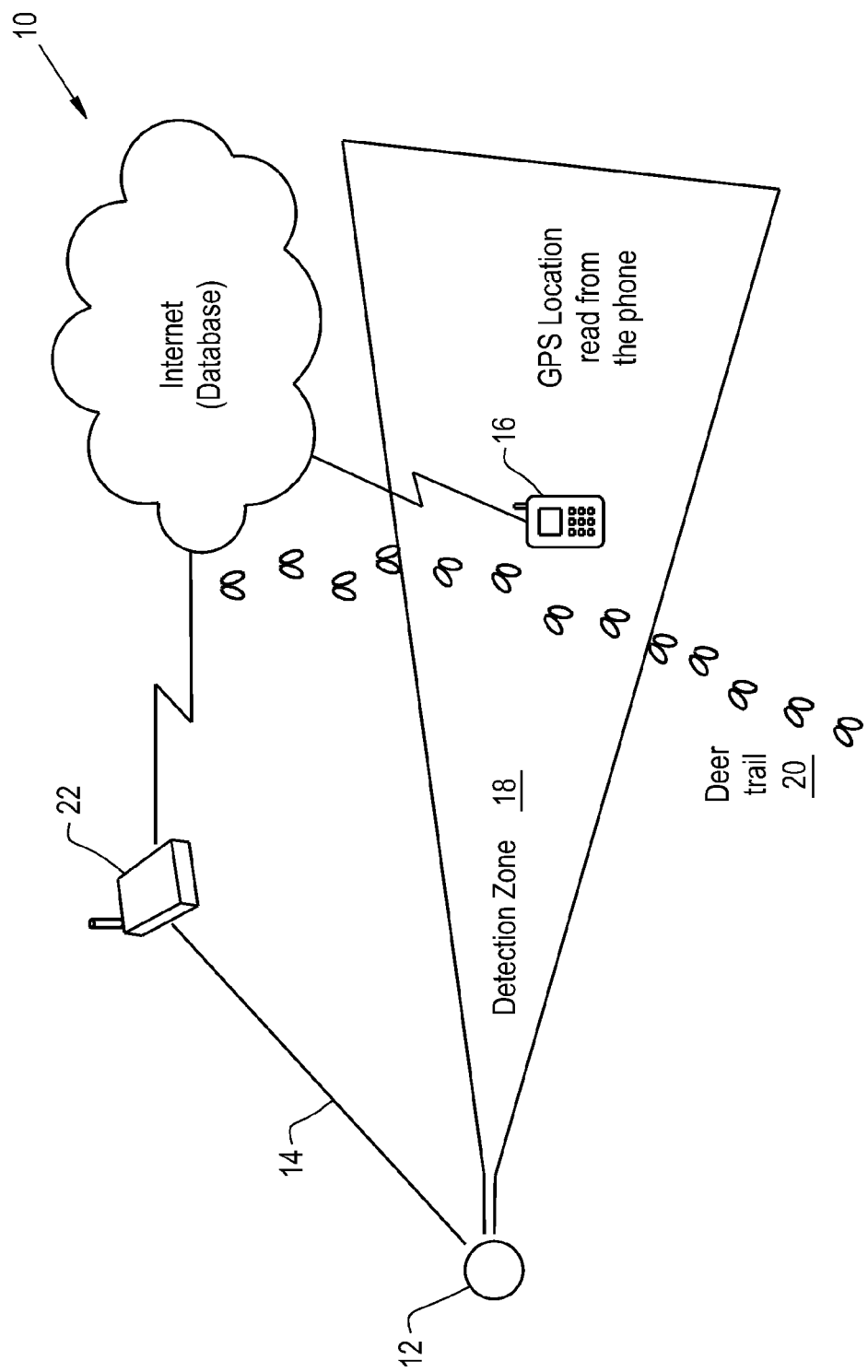
FIG. 3 illustrates a sensor setup along a deer trail for use with the systems of FIGS. 1 and 2.

Sensor Testing and Setup:

The gateway 22 must be in place before the sensors 12 can be set up. While placing each sensor 12, the user must verify, by way of the phone app, the RSSI (Received Signal Strength Indicator) and LQI (Link Quality Indicator) to gateway 22. If the sensor-to-gateway distance is too great or there are barriers affecting the signal and it is weak or depleted, the integrity of the analysis is at risk. This is a continual read, allowing the user to walk to maximum distances and know exactly where the signal breaks down, thus enabling them to be able place the sensors 12 with confidence and in their ability to maintain a reliable signal (See FIG. 3: Sensor Setup).

1. The user attaches sensor 12 to a tree, aiming the sensor 12 at a deer trail 20'-30' away.
2. Using the DeerMapper 10 app on their mobile phone 16, the user activates the sensor test.
3. Carrying phone 16, the user walks along deer trail 20 into detection zone 18.
4. When sensor 12 detects the user's presence in the zone, sensor 12 transmits the event data to gateway 22.
5. Gateway 22 then transmits the event data to the app and the database.
6. When the app receives notification of the event, it displays: "Sensor Event Data Received".
7. The RSSI signal strength and LQI signal quality of sensor 12 is also displayed.
8. Upon notification, the app will update the sensor's GPS location (using the GPS location of phone 16) and the sensor's distance to the trail 20.

This extremely accurate GPS data, determined not by using sensor 12, but the GPS location of phone 16 on the deer trail 20, is an important feature of the present invention, not found in any other system.

Sensor 12 will determine the distance to the user carrying cell phone 16 and register that distance as the sensor's distance to the trail. As each event occurs, DeerMapper 10 will know whether or not the deer is on the trail 20 by comparing the distances. This is an important factor in the analysis of determining the maturity and sex of the deer because bucks tend to take up stances that are off the trails 20, whereas does and immature deer tend to remain on the trail 20.

The exception is when the system is set up in a remote area where there is no cellular or WIFI signal. The setup process remains the same except the user must carry gateway 22 and phone 16, with gateway 22 connected to phone 16 by way of a cable. After the sensors 12 are all in place then gateway 22 is placed to complete the setup.

Functional Overview Summary:

Deer move naturally between bedding, watering, feeding and breeding areas. Deer sometimes change their home range as a result of seasonal changes, agricultural activity, wandering or having been chased.

The factors that cause deer to move from one location to another is the main question DeerMapper 10 is designed to answer. The conclusion will be drawn from 120 factors, influences, and triggers that can cause deer to move, determine when they move, show the direction the deer came from and determine where they are heading. Ultimately, when presented a forecast of conditions, DeerMapper 10 will predict deer movements based on trends established by the location's historical data.

DeerMapper 10 will detect these moving deer at selected locations with sensors. These deer movement events are then transmitted to an online database where the DeerMapper 10 statistical analysis, mapping, prediction and gaming occurs.

The sensors, gateway 22, wireless sensor network, mesh configuration, phone app and database all must work together as a single system to enable execution of the DeerMapper 10 analysis. The data must be precise, extensive and generated by the DeerMapper 10 equipment, because human data generation is inadequate and imprecise. The more sensors, events, factors, influences and triggers available in the frequency distributions, the more valuable and accurate will be the statistical analysis, mapping, prediction and gaming. This can only be accomplished when each component is integrated together into the underlying organizational schema.

Trail camera pictures and manual data entry can be used as ancillary information but are inadequate and too irregular and independent to form a basis for DeerMapper-quality data gathering and analysis.

Wireless trail camera companies will be provided with the opportunity to transmit their information directly to the database as supplemental data. However, the DeerMapper analysis does not require wireless trail cameras or their associated image handling systems, analyses or databases. DeerMapper analysis will recommend the best locations to place trail cameras to add the value of pictures to deer movement events. By working with DeerMapper 10, the cameras can provide added insight into the patterns of an individual animal or to evaluate the make-up, movements and quality of the herd.

Wireless trail cameras lack data. While the trail camera may provide GPS coordinates, they represent the location of the camera, not the deer. The battery level, pixels, animal size, distance from camera, direction of travel and speed of travel are not included in a trail camera image. Since the cost is generally at least 10 times that of a sensor 12, many hunters and landowners find that it is not practical to place them in multiple locations. The missing data can be added manually but at a penalty of time consumption plus the subjectivity and limitations of such information reduces the effectiveness of attempting such a system and any resulting analysis.

DeerMapper 10 is designed with extended battery life and expandable transmission range to increase coverage of the natural deer movement location without human intervention. It is also designed to capture large amounts of data for each event to provide extensive statistical analysis that seeks to determine patterns within those natural movements. Using these patterns, DeerMapper 10 can apply propositional logic to the structured framework of the combined classifications, which are natural factors, calculated influences, action triggers and outside influences to predict a future movement at a specified time and place.

DeerMapper 10 provides, by way of PC, tablet or mobile phone 16, the RSSI (Received Signal Strength Indicator) and LQI (Link Quality Indicator) to enable the layout of a full mesh network 14 with maximum signal and range. As the sensors 12 are being placed, the user watches the RSSI and LQI while selecting locations that assure a strong signal to gateway 22 and across multi-hop sensors 12.

Only DeerMapper 10 can accomplish the functions defined in the above summary. Only DeerMapper 10 has uniquely created, named and defined the terms in its structured framework that makes this possible. Each classification has a set of indicators that form a one-of-a-kind relational data model structure.

Structural Framework of the Combined Classifications:

1. Classifications: Sensor readings, natural factors, calculated influences, action triggers and outside influences. There are 5 classifications of indicator values.
   1.1. Indicators: An indicator is a measuring device that points to its value. It defines and quantifies the value and the rate of change of the environmental conditions at each event. There are 120 indicators.
      1.1.1. Indicator Values: The value and rate of change the indicator points to at each event.
         An example is the wind indicator pointing to the value of 15 mph changing at negative 8 mph per hour. This shows that the wind is dropping and in one hour will be approximately 7 mph.
            1.1.1.1. Rate of change: The rate of change of the indicator value at the time of the event
            1.1.1.2. Current Value: Current value at the time of the event Snapshot: Each movement event is represented by a Snapshot that is a matrix or set made up of:

4 Columns: Classification, Indicator name, Rate of Change, and Current Value

120 Rows: Each Indicator of the event has the 4 column values defined above

Each GPS location has
   a growing frequency distribution of these classifications and indicators represented by their mean (expected value), spread (standard deviation), slope (rate of change toward or away from the mean) and dispersion.
   a growing set of movement events, called snapshots, that illustrate the event by capturing each indicator's value and rate of change at the moment of the event.
   a changing list of the most influential indicators measured when their values are near the mean. The value near the mean presents the highest probability that a movement will happen. Generally, between five to ten of the most influential indicators is sufficient to accurately predict a movement time at the specific location.

Classifications: There are five classifications, defined below, represented as sensor readings, natural factors, calculated influences, action triggers and outside influences. Classifications are groups or categories of indicators with matching qualities. The classifications form the top level of a structured framework used to illustrate scenarios of deer movement. Each of the five classifications contain the indicators that collectively represent their qualities. The indicators values are numeric, providing a quantitative basis for effective statistical analysis.

1. Sensor Readings: These readings are the indicator values determined by sensor 12 when a deer enters its detection area. Each event triggered by sensor 12 is initially defined by these readings that form the basis for the full development of the event.
2. Natural Factors: These factors represent the indicator values existing in nature, not made or caused by people, as one of the things that cause a deer to move. These indicator values are obtained automatically by DeerMapper 10 through web search engine lookups and calculations that match the exact time and location of the event.
3. Calculated Influences: These influences are the calculated indicator values combining sensor readings, natural factors, outside influences and action triggers. These calculations are unique to DeerMapper 10 and not available from any web search engine lookups. These influences indirectly or intangibly have the power to cause deer to move. They are best expressed collectively. An example is the wind influence which includes the wind speed, wind direction, wind shift, and veering wind. Deer will move during a wind change but the speed of travel, trails they use, and the time they move will be determined by the combinations of factors calculated together as a calculated influence.

4. Action Triggers: These triggers are direct causes of movement, not collectively dependent on other indicators. When the trigger value changes and enters an action range on the distribution curve, it will be the cause of a movement. These action ranges are defined via the tendency of quantitative data to cluster around some central value where the strongest probability for change occurs. The cluster or central value is called the mean of the indicator. Examples include wind change, barometric pressure change or dwindling daylight.

5. Outside Influences: These outside influences cannot be determined by sensor 12, web search engine lookups or calculation. These are influences that affect movements that must be entered by the user based on their observation near each sensor 12. Examples include cover, agricultural activity, logging, feeding stations or building projects.

The number of calculated influences will grow as more combinations of readings, factors, influences and triggers are discovered through statistical analysis.

Snapshots—The snapshot is a scenario-based matrix of 204 indicator values that define an event represented as numeric values. When a deer enters detection zone 18 sensor 12 creates an event of sensor readings, the beginnings of a snapshot. DeerMapper 10 will then develop the remaining indicator values, for each classification, to complete the snapshot of the event at a single GPS location (on deer trail 20) and point of time. This development is done through web search engine lookups and proprietary calculations.

The snapshot matrix is made in four columns: classification, indicator name, rate of change and current value. The rows are these four values for each of the 120 indicators. So, a snapshot is a matrix with 480 cells to illustrate each event. Note that the "Rate of Change" value is relevant 28 times for analysis which leaves 388 separate distribution curves to include in the analysis.

The DeerMapper snapshot is the foundation of its statistical analysis, mapping, prediction and gaming. Scenario evaluation is used for assessment of future situations by searching for matching snapshots. Retrospective and prospective studies of the snapshots seek patterns of indicators that cause movement, which will have long-term value for biologists, Departments of Natural Resources and other organizations with responsibility for or interest in deer habits, in addition to the hunters and landowners.

Indicators—The indicator defines and quantifies a condition at its current state of the moment when an event occurs. An indicator is a measuring device that points to its current value and current rate of change.

Wind speed, wind direction and wind change time are just three examples of the 120 unique indicators in a snapshot of an event. If the wind is from the north, the deer will naturally move in the evening to feed in the south field because the wind comes out of the woods onto that field. In this scenario the deer feel safe as they travel east and west along the edge of the field, smelling what is out of sight in the woods.

Wind is one of the most influential triggers for activating deer movement. It is influential but not conclusive because other factors, influences or triggers can skew the probability of the movement. The highest probability is discovered by analyzing many events in the sample data which share common factor, influence and trigger values.

Each indicator also has a rate of change value at the time of the event. The indicator maintenance table defines how this calculation is done by quantifying the size of the change range. The wind change range will be set between one and two hours. If the range is set to one then a rate of change of "−7" will mean that one hour before the event the wind would have dropped 7 mph. These rates for each indicator will be tracking changes, not just current values that are affecting the movements.

When an event occurs, the Snapshot is built and these values are added to the frequency distribution tables of each indicator for each GPS location. DeerMapper 10 will keep their mean (expected value), spread (standard deviation), slope (rate of change toward or away from the mean) and dispersion current on these frequency distribution tables. As these tables grow, so will the accuracy of predictions of deer movements.

The average hunter could be overwhelmed by the volume of data available. To simplify the use of the present invention, DeerMapper 10 has maximized technology so the data is gathered and analysis is done without effort by the user. The user can look at a single map illustration to decide where to hunt or can study the several adjustable charts, graphs and maps to further understand the predicted movements for the hunt.

Frequency Distribution—When deer move, they will trigger events at sensor locations. As these events are repeated, the number of indicator values in the database grow, as do the viability of the frequency distributions in defining each indicator's mean, mode, medium and slope. The modality of these curves may be unimodal, bimodal or multimodal or skewed but the ranges of values will clearly represent what caused the movements.

For example: Change in wind from south to northwest or from north to southwest are both common causes of deer movement from one bedding area to another, even in the middle of the day. As the data of events increases the distribution curve for the "change in wind" indicator will spike near both of these values for the indicator. This forms two means and active ranges to the distribution curve. Either of the means of the bimodal curve can be the cause of a movement. Most of the indicators will form a normal curve with one mean=mode=medium and the skewness=(mean−medium)/standard deviation=0.

As these frequency distributions mature, their means plus range of value (distribution) will be clear and will provide a high probability of a correct forecast of movement. To provide an even greater predictability, DeerMapper 10 combines multiple indicators together to form a single frequency distribution.

Each indicator is detailed by its mean (expected value), spread (standard deviation) and slope (rate of change toward or away from the mean). The action range is made up of the indicator's mean, standard deviation and slope to express the probability that the indicator measurement represents the cause of the deer movement.

Indicator Detail by Classification

The class intervals of the frequency distribution for each indicator will be determined by its historical data. The class intervals are changeable in each indicator distribution report to best represent the data as it comes in.

Each indicator has two values . . .
Rate of change: The rate of change of the value in a predetermined set of time either hours or days.
  Each indicator has its own maintenance file which holds the 'range of time' on either side of the event time to measure the rate of change. Each indicator is unique in this range. The calculation results in a positive, zero or negative number to represent the change up or down the slope. When a lapse rate is available, it will be used.
Current Value: The current value
  Each indicator can be turned on or off by the user or by DeerMapper 10.
  When an indicator's value remains constant throughout the analysis period (change value is at zero), DeerMapper 10 will extract it from the analysis or it can skew the results.

Sensor Readings:
Sensor File
GPS location GPS location of the deer trail 20 in the detection zone 18
Trail distance Distance from the sensor 12 to the trail 20 (entered in the phone app at sensor 12 set up)
Direction The direction to trail 20 from the sensor 12 in Degrees (entered in the phone app at sensor set up)

Note: 0 Rate of Change means that there is no application relevant to the analysis.

There are 120 unique indicators in DeerMapper 10 with 28 Rate of Change calculations.

| Classification | Indicator | Current Value | Rate of Change |
| --- | --- | --- | --- |
| Sensor Reading | Sensor ID | The sensor ID representing the sensor and the account it is registered to | 0 |
| Sensor Reading | Event date/time | The date/time the deer entered the detection zone to the nearest minute | 0 |
| Sensor Reading | Battery level | Percent of battery available | 0 |
| Sensor Reading | RSSI | Signal Strength to the gateway 22: Received Signal Strength Indicator | 0 |
| Sensor Reading | LQI | Signal Quality to the gateway: Link Quality Indicator | 0 |
| Sensor Reading | Pixels | Number of heat pixels when the deer is in the middle of the detection zone | 0 |
| Sensor Reading | Animal Size | Larger than a deer, deer size, smaller than a deer | 0 |
| Sensor Reading | Distance from Sensor | To the nearest foot | 0 |
| Sensor Reading | Direction of Travel | To the Left or right | 0 |
| Sensor Reading | Speed of travel | to the nearest miles per hour | 0 |
| Natural factors | Temperature | Current Temperature in degrees Fahrenheit | Maximum temperature change in the last 2 hours |
| Natural factors | Max Temperature | Maximum temperature in the past 24 hours in degrees Fahrenheit | 0 |
| Natural factors | Min Temperature | Minimum temperature in the past 24 hours in degrees Fahrenheit | 0 |
| Natural factors | Heating Degree Days | Total temperature in a day above the mean in degrees Fahrenheit | 0 |
| Natural factors | Cooling Degree Days | Total temperature in a day below the mean in degrees Fahrenheit | 0 |
| Natural factors | Visibility | How far away objects are visible to a person - identified with the unaided eye in statute miles to nearest tenth | Maximum change in statute miles in the last 2 hours |
| Natural factors | Tides | The water level in feet above or below Mean Low Water | Maximum change in feet in the last 2 hours |
| Natural factors | Dew Point | A measure of atmospheric moisture - temperature for air to reach saturation | Maximum change in degrees in the last 2 hours |
| Natural factors | Humidity | Humidity level in percent | Maximum change in percent in the last 2 hours |
| Natural factors | Sunrise | Time of sunrise by minute | 0 |
| Natural factors | Sunset | Time of sunset by minute | 0 |
| Natural factors | Wind direction | Compass degree | Maximum change in percent in the last 2 hours |
| Natural factors | Wind speed | Miles per hour | Maximum change in Miles per hour in the last 2 hours |
| Natural factors | Wind Shift | Time: Change in wind direction of 45 degrees or more in less than 15 minutes | When did the change last occur in hours. If the change is more than four hours the value is zero |
| Natural factors | Veering Winds | A clockwise direction switch in wind. This is the time it occurred | When did the change last occur in hours. If the change is more than four hours the value is zero. |

-continued

| Classification | Indicator | Current Value | Rate of Change |
|---|---|---|---|
| Natural factors | Backing | A counter clockwise switch in wind. This is the time it occurred | When did the change last occur in hours. If the change is more than four hours the value is zero. |
| Natural factors | Vorticity | Is a clockwise or counterclockwise spin in the troposphere 0 = no 1 = yes | When did the change last occur in hours. If the change is more than four hours the value is zero. |
| Natural factors | Snow Advisory | 0 = no 1 = yes | 0 = no and 1 = yes for a snow advisory in the last 2 hours |
| Natural factors | Snow | How fast it is snowing - 0 = none 1 = sleet, 2 = flurries, 3 = moderate, 4 = heavy | Maximum change in the last 2 hours |
| Natural factors | Snow total | Snow total in the last 24 hours | 0 |
| Natural factors | Snow Depth | Depth of snow on the ground in inches | Maximum change in the Depth of snow in the last 2 hours |
| Natural factors | Rain | How fast it is raining - 0 = none 1 = mist, 2 = sprinkle, 3 = moderate, 4 = heavy | Maximum change in the last 2 hours |
| Natural factors | Rain total | Total rain in the last 24 hours | 0 |
| Natural factors | Rain last week | Total rain in the last week | 0 |
| Natural factors | A Index | Solar-terrestrial index of geomagnetic activity (flares, geomagnetic storms) SFUs (Solar Flux Units) solar flux 2.8 GHz | 0 |
| Natural factors | Artic Oscillation | Atmospheric pressure at polar/middle latitudes fluctuates phases saturation | 0 |
| Natural factors | Cloud cover | Percent of the sky covered with clouds | Maximum change in percent in the last 2 hours |
| Natural factors | Sun illumination | Lux | Maximum change in lux in the last 2 hours |
| Natural factors | Ultraviolet Index | Ozone levels to UV incidence on the ground | Maximum change in Ultraviolet Index in the last 2 hours |
| Natural factors | Sun altitude | Angle from the horizon | 0 |
| Natural factors | Sun azimuth | Angle along the horizon | 0 |
| Natural factors | Astronomical Dawn | Time when the morning sun 18 degrees below the horizon | 0 |
| Natural factors | Astronomical Dusk | Time when the morning sun 18 degrees below the horizon | 0 |
| Natural factors | Declination | The latitude where the sun is directly overhead - show solstice and equinox | Maximum change in latitude declination from the day before |
| Natural factors | Insolation | The total amount of solar radiation energy received by surface area in the past hour | Maximum change in the hourly irradiation in the past two hours |
| Natural factors | Barometric pressure | Barometer in inches (hundredths) | Maximum change in Barometric pressure in the last 2 hours |
| Natural factors | Pressure Change | The net difference between the barometric pressure at three hour intervals | 0 |
| Natural factors | Moon illumination | Lux | Maximum change in lux in the last 2 hours |
| Natural factors | Moon rise | 24 hour time of the moon rise to the closest minute | 0 |
| Natural factors | Moon set | hour time of the moon set to the closest minute | 0 |
| Natural factors | Moon minor begin time | 24 hour time to the closest minute | 0 |
| Natural factors | Moon minor end time | 24 hour time to the closest minute | 0 |
| Natural factors | Moon major begin time | 24 hour time to the closest minute | 0 |
| Natural factors | Moon major end time | 24 hour time to the closest minute | 0 |
| Natural factors | Lunar phase | Moon Phase 1 = New Moon, 2 = Waxing Crescent, 3 = First Quarter, 4 = Waxing Gibbous, 5 = Full Moon, 6 = Waning Gibbous, 7 = Last Quarter, 8 = Waning Crescent | 0 |
| Natural factors | Lunar - current age | how far along the moon is in a full cycle in days | 0 |

-continued

| Classification | Indicator | Current Value | Rate of Change |
|---|---|---|---|
| Natural factors | Lunar - percent full | 0% to 100% full | 0 |
| Natural factors | Moon altitude | Angle from the horizon | 0 |
| Natural factors | Moon azimuth | Angle along the horizon | 0 |
| Natural factors | Length of day | Sunset minus sunrise in minutes | 0 |
| Natural factors | Alberta Clipper | Fast moving low pressure - this is a start time for that front if the same day | Minutes since the Alberta Clipper started |
| Natural factors | SWEAT | Severe Weather ThrEAT index, a stability index developed by the Air Force. 150-300 Slight severe, 300-400 Severe possible, 400+Tornadic possible | 0 |
| Natural factors | Lifted Index | Measure of atmospheric instability - ground temperature compared to 18K feet | 0 |
| Natural factors | Lapse Rate | The rate of change of an atmospheric variable, in this case temperature. | Maximum change in lapse rate in the last 2 hours |
| Natural factors | K-Index | A measure of the thunderstorm potential based on vertical temperature lapse | Maximum change in K-index in the last 2 hours |
| Natural factors | Cold Front | The time the cold front entered the area if more than 2 days mark it as zero) | Minutes since the cold front entered the area |
| Natural factors | Warm front | The time the warm front entered the area (if more than 2 days mark it as zero) | Minutes since the warm front entered the area |
| Natural factors | Convergence | The time the convergence occurs (if more than 2 days mark it as zero) | Minutes since the convergence occurred |
| Calculated influences | Sound factor Wind | Calculation combining wind speed 1 = low, 2 = medium, 3 = high | 0 |
| Calculated influences | Sound factor Crunch | Calculation combining rain, snow, snow depth, date and temperature 1 = low, 2 = medium, 3 = high | 0 |
| Calculated influences | Sound factor | Combined wind and crunch 2 (low), 3, 4, 5 and 6 (high) | 0 |
| Calculated influences | Scent factor | Combined wind, humidity, temperature and precipitation 1 = low, 2 = medium, 3 = high | 0 |
| Calculated influences | Scent factor Thermals | Combined wind, humidity, temperature, precipitation and time of day 1 = low, 2 = medium, 3 = high | 0 |
| Calculated influences | Time factors Morning | Calculation at time ranges | 0 |
| Calculated influences | Time factors Mid-day | Calculation at time ranges | 0 |
| Calculated influences | Time factors Evening | Calculation at time ranges | 0 |
| Calculated influences | Time factors Dark | Calculation at time ranges | 0 |
| Calculated influences | Wind Factor North (Azimuth 315°-0°-45°) | Calculation at four wind speed ranges | 0 |
| Calculated influences | Wind Factor East (Azimuth 46°-135°) | Calculation at four wind speed ranges | 0 |
| Calculated influences | Wind Factor South (Azimuth 136°-225°) | Calculation at four wind speed ranges | 0 |
| Calculated influences | Wind Factor West (Azimuth 226°-315°) | Calculation at four wind speed ranges | 0 |
| Calculated influences | Wind Factor Shift | Calculation at four wind shift ranges | 0 |
| Calculated influences | Wind Factor | Calculation at four wind speed ranges | 0 |
| Calculated influences | Speed factor | Calculation combining speed and various sound, scent and outside influences | 0 |
| Calculated influences | Location factors | Calculation combining percent chance of movement at time ranges and place | 0 |
| Calculated influences | Food factor | Calculation combining wind and outside influences | 0 |
| Calculated influences | Intrusion factor | Calculation combining wind, hunting pressure, logging and outside influences | 0 |
| Calculated influences | Cover factor | Calculation combining cover, habitat, logging, construction | 0 |
| Calculated influences | Photoperiod | Calculation combining time from sunrise to sunset, illumination, cloud cover | 0 |
| Calculated influences | On the trail | Calculation combining distance to trail minus distance to the deer | 0 |
| Calculated influences | Time after sunrise | Calculation combining event time minus sunrise | 0 |
| Calculated influences | Time before sunset | Calculation combining sunset minus event time | 0 |

| Classification | Indicator | Current Value | Rate of Change |
| --- | --- | --- | --- |
| Calculated influences | Time before wind switch | Calculation combining wind shift time minus event time | 0 |
| Calculated influences | Time after wind switch | Calculation combining wind event time minus shift time | 0 |
| Calculated influences | Rutting phase | Lookup the rutting phase at the event build 0 = no rut, 1 = pre-rut, 2 = seeking and chasing, 3 = peak-rut, 4 = post-rut | 0 |
| Calculated influences | Moon rating | Lookup the moon phases, major, minor to calculate how much of an influence | 0 |
| Action triggers | Sound Range | Calculations using Sound Factor Wind and Sound Factor Noise 1 = Short Distance, 2-Medium distance and 3 = Long distance | 0 |
| Action triggers | Barometric change drop | Largest drop in hour 1, 2, 3 or 4 | 0 |
| Action triggers | Barometric change rise | Largest rise in hour 1, 2, 3 or 4 | 0 |
| Action triggers | Precipitation change drop | Largest drop in hour 1, 2, 3 or 4 | 0 |
| Action triggers | Precipitation change rise | Largest rise in hour 1, 2, 3 or 4 | 0 |
| Action triggers | Scent factor drop | Last drop of the Calculated Influence Scent factor in hour 1, 2, 3 or 4 | 0 |
| Action triggers | Scent factor rise | Last rise of the Calculated Influence Scent factor in hour 1, 2, 3 or 4 | 0 |
| Action triggers | Temperature change drop | Largest drop in hour 1, 2, 3 or 4 | 0 |
| Action triggers | Temperature change rise | Largest rise in hour 1, 2, 3 or 4 | 0 |
| Action triggers | Wind change veering | Last change in hour 1, 2, 3 or 4 | 0 |
| Action triggers | Wind change backing | Last change in hour 1, 2, 3 or 4 | 0 |
| Action triggers | Wind change shift | Last change in hour 1, 2, 3 or 4 | 0 |
| Action triggers | Wind change | 0 = no change, 1, 2 or 3 of the veering, backing or shift occurred. | 0 |
| Action triggers | Snow change | When did it originate: 0, 1, 2 or 3 hours ago there was moderate to heavy snow. | 0 |
| Action triggers | Rain change | When did it originate: 0, 1, 2 or 3 hours ago there was moderate to heavy rain. | 0 |
| Outside Influences | Agricultural activity | 0 = no influence, 1 = Plowed, 2 = just planted, 3 = new growth, 4 = mature, 5 = cut | 0 |
| Outside Influences | Predators | Predators in the areas like coyotes, wolves or bears, 0 = no, 1 = yes | 0 |
| Outside Influences | Building projects | 0 = no, 1 = yes | 0 |
| Outside Influences | Logging | 0 = no, 1 = yes | 0 |
| Outside Influences | Feeding stations | 0 = no, 1 = yes | 0 |
| Outside Influences | Hunting pressure | 0 = no, 1 = hunting season | 0 |
| Outside Influences | Competition | 0 = no, 1 = low, 2 = medium, 3 = high | 0 |
| Outside Influences | Distance to water | In yards | 0 |
| Outside Influences | Distance to field | In yards | 0 |

Calculations:

Calculated Influences are based mainly on the indicator value changes trends.

Sound factors—How a deer responds to these sound factors is what DeerMapper 10 seeks by adding these calculated factors to the analysis. Sound factor is effected by the wind and the dryness of the leaves. Deer change their behavior in calm wind or strong wind. The dryness of the fallen leaves will also effect the sounds in the woods. Loud, crunchy leaves means the sounds of moving animals carries long distances. New snow quiets the woods and deer move differently during this quiet time.

Sound Factor Wind
1=low wind (calm to 10 mph)
2=medium wind (10 mph to 20 mph)
3=strong wind (>20 mph)

Sound Factor Noise
1=low noise (Rain Total>1" or Rain Last Week>1" or Snow total>3" or snow depth>6") and (temperature>250)
2=medium noise is not a 1 or a 3 in the calculation.
3=high noise (date is between October 1 and November 30th) and (snow depth=0) and (rain last week<0.5 inch)

Sound Factor
Combined wind and noise factors: 2 (low), 3, 4, 5, and 6 (High)

Note that DeerMapper 10 is using qualitative data and converting it to quantitative data so that it works well in the statistical analysis. The objective is to make it as free from interpretation as possible so that the analysis is based on empirical data not intuition.

The results of large data samples provides new insights into how wind and crunch affect how the deer move. If they move later, earlier or in a different location dependent on the sound factor is to be determined by the data.

Scent Factor

Calculation combines humidity, rain, snow, wind speed, time of day. A deer's ability to smell is 100 times greater than humans. The scent factor is a major factor in the analysis affecting when, where and how fast deer move from one location to another.

If all factors are ideal, a deer can smell a human up to ½ mile away, yet if these factors are not, a deer can only smell 10 to 20 yards.

Factors considered in this calculation that enhance a deer's sense of smell

Humid air, greater than 50%, enhances a deer's sense of smell
The less wind the wider the scent cone
Ideal wind to carry scent long distances is 5 MPH
Strong wind creates a narrow scent cone but travels further
Thermals move up hill in the morning
Thermals move down hill in the evening
Factors considered in this calculation that reduce the sense of smell
Low humidity reduces their sense of smell
Rain or snow reduce the deer's ability to smell as the scent is pushed to the ground
Rain and snow dilute the scent
Fog also reduces their ability to pick up a scent
Low humidity, between 10-20%, works against deer
High temperature, greater than 70° F., pushes the scent up thus reducing the scent
Low temperature, less than 20° F., pushes the scent to the ground thus reducing the scent
Scent Factor

| | |
|---|---|
| 1 = Low Enhancement if Total1 = 3 or 4 | |
| (Temperature <20° or >69°) add 1 | low or high temperature |
| (Humidity <30%) add 1 | low humidity |
| (Wind Speed >19 MPH or wind = calm) add 1 | high wind or no wind |
| (Raining or Snowing) add 1 | raining or snowing |
| =Total1 | |
| 2 = Medium Enhancement -- if NOT (Low or High Enhancement) | |
| 3 = High Enhancement if Total3 = 3 or 4 | |
| (Temperature >32° and <70°) add 1 | medium/high temperature |
| (Humidity >49%) add 1 | high humidity (after a rain) |
| (Wind Speed <10) and (not calm) add 1 | low wind |
| (not raining or snowing) and (not fog) and (not mist) add 1 | no moisture |
| =Total3 | |

Scent Factor Thermals

| | |
|---|---|
| 1 = Low Thermals | |
| ((Time <8 AM >1 PM) or (Time <3 PM and >8 PM)) or | not morning or evening |
| (Wind Speed >10 MPH) or | not low wind |
| (raining or snowing) or (mist) | raining or snowing or mist |
| 2 = Medium Thermals if NOT (Low or High Thermals) | |
| 3 = High Thermals | |
| ((Time >8 AM <1 PM) or (Time >3 PM and <8 PM)) and | morning or evening |
| (Wind Speed <8 MPH) and | low wind |
| (Humidity >40%) add 1 | high humidity (after a rain) |
| (not raining or snowing) and (not fog) and (not mist) | no moisture |

Time Factors
Calculation predicting percent chance of movement at time ranges
Time Factor Morning in hour increments

| | |
|---|---|
| 1 = 2 hours before sunrise | 61-120 minutes before sunrise |
| 2 = 1 hour before sunrise | 0-60 minutes before sunrise |
| 3 = 1 hour after sunrise | 0 = 60 minutes after sunrise |
| 4 = 2 hours after sunrise | 61-120 minutes after sunrise |

Time Factor Mid-day in 2 hour increments
1=3 and 4 hours after sunrise
2=5 and 6 hours before sunrise plus time between 2 and 3
3=5 and 6 hours before sunset
4=3 and 4 hours after sunset
Time Factor Evening in Hour Increments

| | |
|---|---|
| 1 = 2 hours before sunset | 61-120 minutes before sunset |
| 2 = 1 hour before sunset | 0-60 minutes before sunset |
| 3 = 1 hour after sunset | 0-60 minutes after sunset |
| 4 = 2 hours after sunset | 61-120 minutes after sunset |

Time Factor Dark in 3 Hour Increments
1=3, 4 and 5 hours after sunset
2=5, 6 and 7 hours after sunset plus time between 2 and 3
3=5, 6 and 7 hours before sunset
4=3, 4 and 5 hours before sunrise
Wind Factor
Calculation Combining Wind Direction, Wind Speed, Wind Shift
Wind Factor North (Azimuth 315°-0°-45°)

| | |
|---|---|
| 1 = Wind Speed | Calm - 10 MPH |
| 2 = Wind Speed | 11 MPH-20 MPH |
| 3 = Wind Speed | 20 MPH-30 MPH |
| 4 = Wind Speed | >30 MPH |

Wind Factor East (Azimuth 46°-135°)

| | |
|---|---|
| 1 = Wind Speed | Calm - 10 MPH |
| 2 = Wind Speed | 11 MPH-20 MPH |
| 3 = Wind Speed | 20 MPH-30 MPH |
| 4 = Wind Speed | >30 MPH |

Wind Factor South (Azimuth 136°-225°)

| | |
|---|---|
| 1 = Wind Speed | Calm - 10 MPH |
| 2 = Wind Speed | 11 MPH-20 MPH |
| 3 = Wind Speed | 20 MPH-30 MPH |
| 4 = Wind Speed | >30 MPH |

Wind Factor West (Azimuth 226°-315°)

| | |
|---|---|
| 1 = Wind Speed | Calm - 10 MPH |
| 2 = Wind Speed | 11 MPH-20 MPH |
| 3 = Wind Speed | 20 MPH-30 MPH |
| 4 = Wind Speed | >30 MPH |

Wind Factor

| | |
|---|---|
| 1 = Wind Speed | Calm - 10 MPH |
| 2 = Wind Speed | 11 MPH-20 MPH |
| 3 = Wind Speed | 20 MPH-30 MPH |
| 4 = Wind Speed | >30 MPH |

Wind Factor Shift
1=Wind Shift last 1 hour
2=Wind Shift last 2 hours
3=Wind Shift last 3 hours
4=Wind Shift>3 hours or no wind shift
Calculations: Action Triggers
Sound Range
1=Short Distance: Sound Factor Wind=3 and Sound Factor Noise=3
2=Medium Distance: Sound Range is NOT Short or Long Distance 3=Long Distance: Sound Factor Wind=1 and Sound Factor Noise=1

Barometric Change

We are looking to see if and when barometric pressure changes effect the deer movement. A slow-moving storm would be about 0.02 to 0.03 inches per hour drop where a fast-moving storm will be about 0.05 to 0.06 inches per hour drop.

In this analysis we are looking to find the hour before the deer movement with the maximum rate of change. This will let us know how long the change took to get the deer to move.

Barometric Drop—when was the Largest Drop
- 1=if 1 hour ago was the largest drop in the last 4 hours
- 2=if 2 hours ago was the largest drop in the last 4 hours
- 3=if 3 hours ago was the largest drop in the last 4 hours
- 4=if 4 hours ago was the largest drop in the last 4 hours or no drop Barometric Rise—when was the Largest Rise
- 1=if 1 hour ago was the largest rise in the last 4 hours
- 2=if 2 hours ago was the largest rise in the last 4 hours
- 3=if 3 hours ago was the largest rise in the last 4 hours
- 4=if 4 hours ago was the largest rise in the last 4 hours or no rise Precipitation Change We are looking to see if and when precipitation changes effect the deer movement. In this analysis we are looking to find the hour before the deer movement with the maximum rate of change. This will let us know how long the change took to get the deer to move.

We will use the precipitation rate which is the average volume of water in the form of rain, snow, hail, or sleet that falls per unit of area and per hour at the site.

Precipitation Drop—when was the Largest Drop in Rate of Precipitation
- 1=if 1 hour ago was the largest drop in the last 4 hours
- 2=if 2 hours ago was the largest drop in the last 4 hours
- 3=if 3 hours ago was the largest drop in the last 4 hours
- 4=if 4 hours ago was the largest drop in the last 4 hours or no precipitation Precipitation Rise—when was the Largest Rise
- 1=if 1 hour ago was the largest rise in the last 4 hours
- 2=if 2 hours ago was the largest rise in the last 4 hours
- 3=if 3 hours ago was the largest rise in the last 4 hours
- 4=if 4 hours ago was the largest rise in the last 4 hours or no precipitation Scent Change We are looking to see if and when the Calculated Influence—Scent factor changes effect the deer movement. In this analysis we are looking to find the last drop or rise in 1 to 4 hours before the deer movement. This will let us know how long ago the change that caused them to move took place.

Scent Drop—when was the Last Drop in the Calculated Influence—Scent Factor
- 1=if 1 hour ago was the last drop in the last 4 hours
- 2=if 2 hours ago was the last drop in the last 4 hours
- 3=if 3 hours ago was the last drop in the last 4 hours
- 4=if 4 hours ago was the last drop in the last 4 hours Scent Rise—when was the Last Rise in the Calculated Influence—Scent Factor
- 1=if 1 hour ago was the last rise in the last 4 hours
- 2=if 2 hours ago was the last rise in the last 4 hours
- 3=if 3 hours ago was the last rise in the last 4 hours
- 4=if 4 hours ago was the last rise in the last 4 hours Temperature Change We are looking to see if and when temperature changes effect the deer movement. In this analysis we are looking to find the hour before the deer movement with the maximum rate of change. This will let us know how long the change took to get the deer to move.

Temperature Drop—when was the Largest Drop in Temperature
- 1=if 1 hour ago was the largest drop in the last 4 hours
- 2=if 2 hours ago was the largest drop in the last 4 hours
- 3=if 3 hours ago was the largest drop in the last 4 hours
- 4=if 4 hours ago was the largest drop in the last 4 hours Temperature Rise—when was the Largest Rise in Temperature
- 1=if 1 hour ago was the largest rise in the last 4 hours
- 2=if 2 hours ago was the largest rise in the last 4 hours
- 3=if 3 hours ago was the largest rise in the last 4 hours
- 4=if 4 hours ago was the largest rise in the last 4 hours Wind Change What we are calculating here is that during the four hours before the event we are asking, "When did the change last occur?" Veering (clockwise), backing (counterclockwise) and shift (Change in wind direction of 45 degrees or more in less than 15 minutes) are dramatic changes in the wind direction. These will likely effect the deer movement. One example is that deer change bedding areas in the middle of the day if one of these events occur.

Wind Change Veering—when Did the Veering Winds Occur
- 0=There was no wind veering in the last four hours
- 1=if 1 hour ago was the last veering wind in the last 4 hours
- 2=if 2 hours ago was the last veering wind in the last 4 hours
- 3=if 3 hours ago was the last veering wind in the last 4 hours
- 4=if 4 hours ago was the last veering wind in the last 4 hours Wind Change Backing—when Did the Backing Winds Occur
- 0=There was no wind backing in the last four hours
- 1=if 1 hour ago was the last backing wind in the last 4 hours
- 2=if 2 hours ago was the last backing wind in the last 4 hours
- 3=if 3 hours ago was the last backing wind in the last 4 hours
- 4=if 4 hours ago was the last backing wind in the last 4 hours Wind Change Shift—when Did the Shift Winds Occur
- 0=There was no wind shift in the last four hours
- 1=if 1 hour ago was the last shift wind in the last 4 hours
- 2=if 2 hours ago was the last shift wind in the last 4 hours
- 3=if 3 hours ago was the last shift wind in the last 4 hours
- 4=if 4 hours ago was the last shift wind in the last 4 hours Wind Change—
- 0=No wind change has occurred in the last four hours.
- 1=One of the backing, veering or shift occurred and two did not
- 2=Two of the backing, veering or shift occurred and one did not
- 3=All three of the backing, veering or shift occurred Snow Change This action trigger is looking to find out how long it takes for a moderate to heavy snow to cause deer to move.
- 0=In the last four hours there is no Natural factor Snow as 3=moderate or 4=heavy 1=1 hour ago is the first time in the last 4 hours that Natural factor Snow was at 3=moderate or 4=heavy 2=2 hours ago is the first time in the last 4 hours that Natural factor Snow was at 3=moderate or 4=heavy 3=3 hours ago is the first time in the last 4 hours that Natural factor Snow was at 3=moderate or 4=heavy Rain Change This action trigger is looking to find out how long it takes for a moderate to heavy rain to cause deer to move.

0=In the last four hours there is no Natural factor Rain as 3=moderate or 4=heavy 1=1 hour ago is the first time in the last 4 hours that Natural factor Rain was at 3=moderate or 4=heavy 2=2 hours ago is the first time in the last 4 hours that Natural factor Rain was at 3=moderate or 4=heavy 3=3 hours ago is the first time in the last 4 hours that Natural factor Rain was at 3=moderate or 4=heavy Data Build Process When a deer enters detection zone 18 of sensor 12, an event is triggered and DeerMapper 10 generates the snapshot of the event.

1. Sensor readings: The sensor data is transmitted to the database as the first step in building the snapshot.
2. File Lookup: Determines GPS location and the deer position related to the trail 20 is determined.
3. Natural factors: The natural factors are retrieved from various web-based databases, Including, but not limited to, the National Climatic Data Center (NCDC).
4. Calculations: The calculated influences are resolved and added.
5. Influences: The outside influences that are maintained by the user are added to the snapshot.
6. Camera image: If there is a camera image available, it is added to the event snapshot.
7. Triggers: Finally the action triggers are calculated and added to complete the snapshot.

The statistical analysis, mapping and prediction are executed live when they are needed.

DeerMapper Analysis

History generally repeats itself if all the factors, triggers and influences line up with a snapshot that was calculated in the past. This science of analysis is unique to DeerMapper 10 in the volume of data in each event, the data structure, along with multiple events from multiple locations being assessed together to predict future patterns and events. Lesser data complexity can provide only a guess, or intuition, about what will happen. DeerMapper 10 may be compared to weather forecasting, stock market forecasting and football game predictions in that the use of data can be extensive. Future events can be predicted given enough data. Even though the statistical compellations are complex, the conceptual framework and diagrammatic presentation of results produced through them are easy to understand, depend on and apply.

Analysis:

The user's portion of the analysis is simple, yet tools are available for the technically savvy user. Most predictions are reliable with only one natural factor not requiring many indicators. For example, in a south wind the deer will naturally move to the north field to feed in the late afternoon so they can scan the woods by way of scent and the field by sight. If no other factors fall outside an action trigger there is a high probability of what trail the deer will use and at what time.

The dashboard graphics and report writer present each indicator in the Natural Factors, Calculated Influences, Activity Zones and Outside Influences.

The statistical analysis looks for changing conditions by activity zone, trend and combination of factors to calculate patterns in deer movements. These trends are represented in summary format to quickly identify movement patterns that can be quickly and easily identified.

The determination factors of whether the movement includes young deer, mature deer, doe or buck are the size of animal, pixel count and time of movement. The analysis will recommend camera placement and if used will provide additional verification of the quality of the deer.

Mapping: Each GPS location registered has Event Data associated with it. The GPS locations are added to an interactive Google map. Trends on the map connect GPS locations to draw trails that can be verified with additional sensor placement.

Prediction: The movement factors and patterns are used to match the current weather forecast to determine where the deer will be and when. Probabilities are calculated for each location using past data under the similar conditions.

For the hunter who lives hours from their hunting land, this is a perfect fit. The prediction report will show the best stand locations, the time deer will use the trail and the probability of seeing the deer. The remote hunter can enjoy a live dashboard showing these movements throughout the week as they approach the weekend hunt. Having a wireless camera transmitting pictures to the database is an added verification of what will happen.

DeerMapper Analysis: Calculations

Univariate/Bivariate Statistics

The bottom line for the user is to discover the top indicators that cause deer to move past any particular sensor 12. DeerMapper 10 looks for the central tendency of each of the 120 indicators and their relationship to time of day. These calculations are of the mean, mode, median, range, variance, max, min, quartiles, and standard deviation of each indicator. The probability is calculated from the values within one standard deviation from the mean.

The mean represents the value of the indicator that is most common. The standard deviation quantifies the amount of variation or dispersion of a set of indicator values. If the standard deviation is close to 0 most of the data is close to the mean, whereas if there is a high standard deviation the data points are spread out over a wider range of values. The lower the standard deviation the stronger the focus of the indicator. This is also taken into account for the calculation.

For indicators that are circular, like wind direction, the normal distribution calculations change. NW is close to N but have azimuth of 0 compared to 315 (opposite ends of the scale) so the distribution results are not correct. So, the frequency counts are used to determine the top wind directions not the mean or standard deviation. For this application it is sufficient to be able to determine the prevailing wind showing the highest counts so applying circular distribution equations is not necessary.

Here are three methods used by DeerMapper 10 to determine the probability of each indicator as having influence enough to be a cause of deer to move past the sensor. A single indicator may or may not be causal as it generally is a combination of several indicators that influence the movement.

Daily Probability

Figure 4:
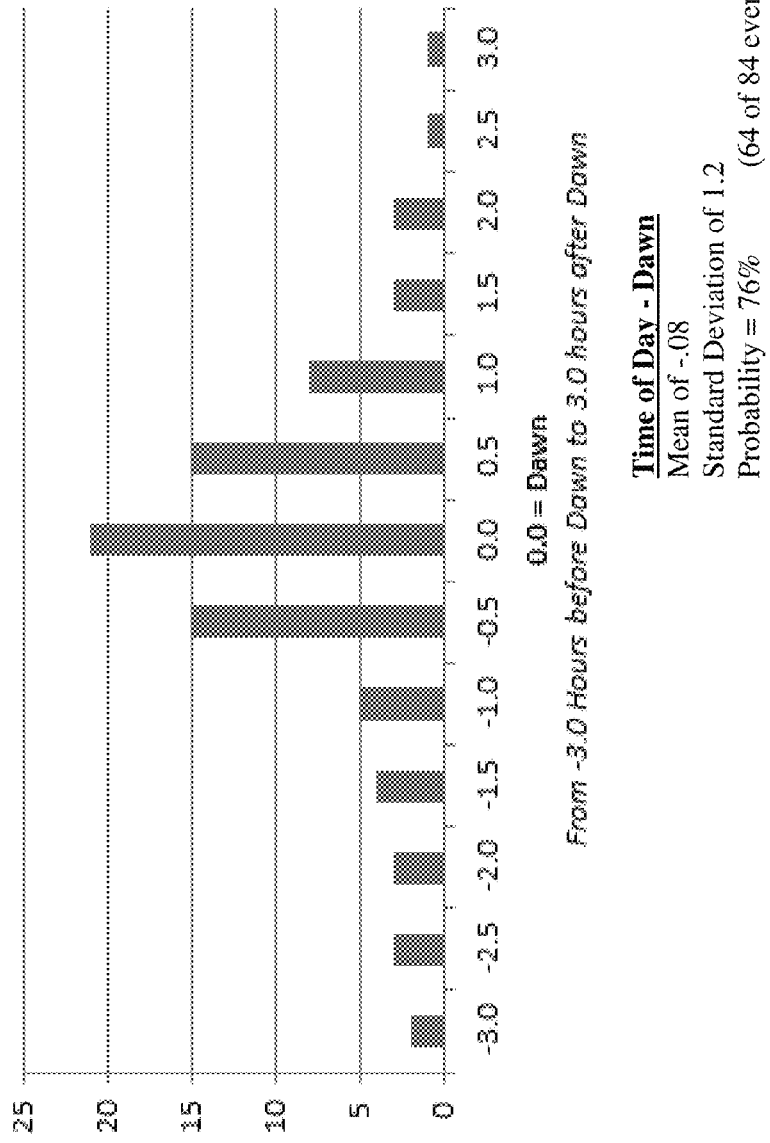
FIG. 4 illustrates the timing of deer movement at a particular sensor of the system of FIGS. 1-3.
Figure 5:
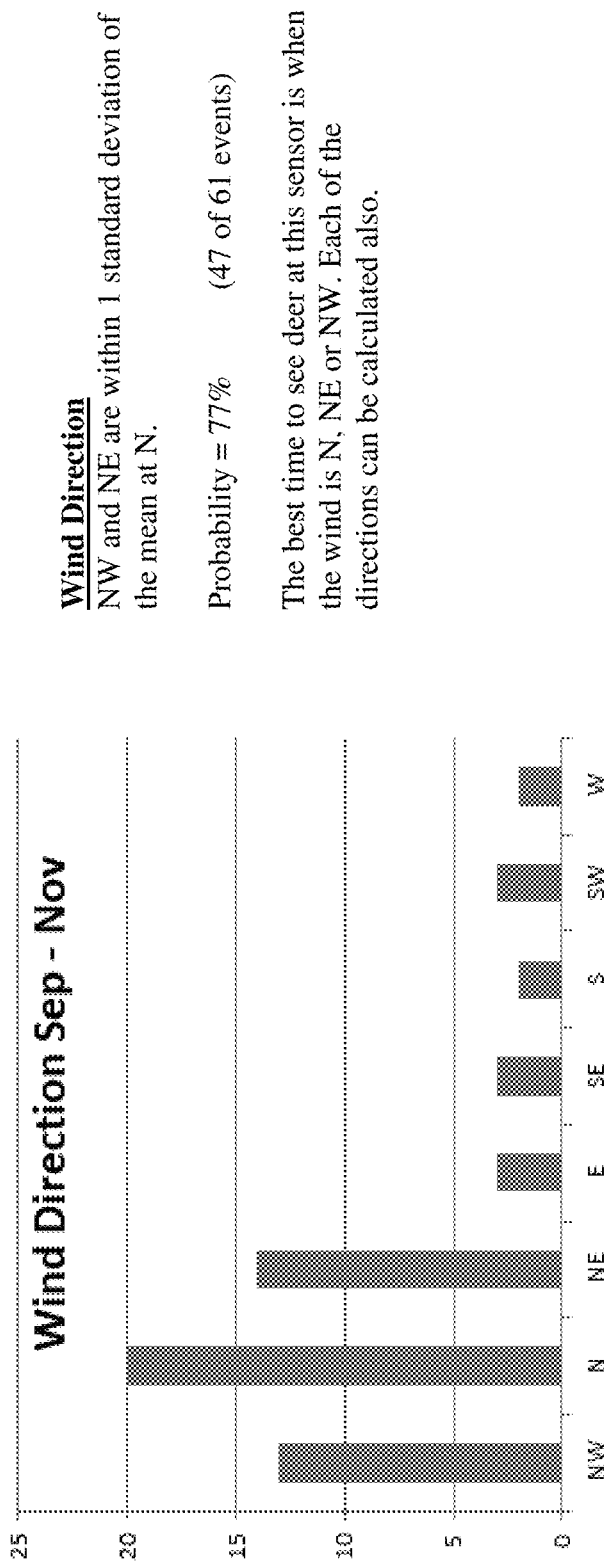
FIG. 5 illustrates the probability of seeing a deer proximate to a particular sensor dependent upon the wind direction.

Daily probability or daily odds are calculated for each sensor as follows:

1) Calculate the mean, standard deviation, variance and probability of the Time of Day Dawn, Time of Day Dusk and each of the 120 indicators. The time of day will be adjusted each day by its relationship to dawn and dusk to account for the seasonal change in length of day. For example, see FIG. 4 where there is shown that the best time to see deer at this sensor is 1.2 hours each side of dawn with the most activity being 5 minutes before dawn (−0.08 hours). Now, additionally referring to FIG. 5 it can be see that the best time to see deer at this sensor is when the wind is N, NE or NW. Each of the directions can be calculated also.

Figure 6:
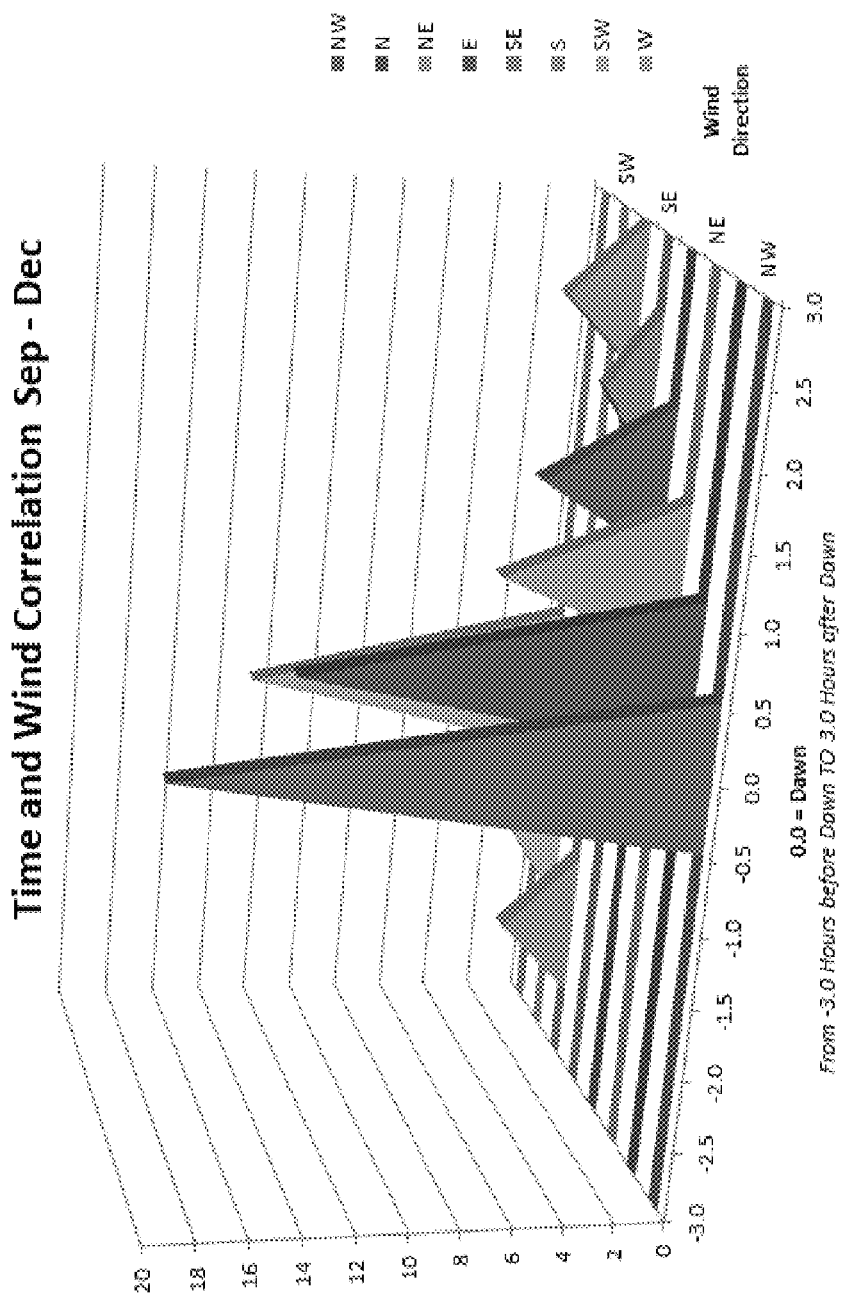
FIG. 6 illustrates a chart denoting a correlation of time and wind data at a sensor.

2) Distributions of each of these indicators will then be correlated to time of day to calculate the relationship to the movements to each indicator. Now, additionally referring to FIG. 6 the best time to hunt at this sensor is at dawn with a N or NW wind.

3) The top 5 indicators will be used to illustrate the simplest analysis of a sensor on a selected day.

Top five indicators for Sensor A on Thursday 14th probability of 79% if

Time=1.2 hours either side of dawn 76%

Wind Direction=N, NE, NW 77%

Barometric drop=4 84%

Precipitation drop=4 88%

Wind factor shift=4 72%

What this also says is that the best time at this sensor is when there is stable weather i.e. little or no barometric change, precipitation change or wind shift.

The majority, say ninety percent of the statistics done by DeerMapper 10 is Univariate/Bivariate. Multivariate is reserved for biological or mathematical research. This research will provide published papers for the users to gain even more insight into the movement of deer but not have to do the rigorous analysis required by multivariate analysis.

Multivariate Statistics

To further expand the insight into the causes, DeerMapper 10 provides methods to establish relationships between multiple indicators. The analysis here is between multiple variables simultaneously to look for correlations, comparisons and explanations from multiple points together.

Some of the indicators will become dependent on one another and some will remain independent and not follow a relationship. As more data is applied more insight in these relationships is formed.

Because of the complexity of these calculations they are not listed here. Also, the actual analysis will require specialized statistical software.

Multivariate statistics is mainly reserved for biologists and mathematicians to do research for publication. The assumption is that the volume of data being received will spawn many research projects.

Clock Analysis Tool

Time is a central focus of the DeerMapper 10 analysis. DeerMapper 10 provides event data analysis for each sensor 12 location. The hunter uses that analysis to determine when the deer will move past each sensor 12 in the future. DeerMapper 10 determines the probability of when deer will pass in front of each specified sensor. The DeerMapper 10 Clock is one of the simplest tools available to the hunter to illustrate the probability for each location of when the deer will pass. This clock provides a path to the more complex calculations and data to educate the hunter to why the deer are moving past. DeerMapper 10 is based on empirical data and statistical analysis. But, with this empirical data in place, the hunter is better equipped to use all of his instincts and intuition for the hunt.

The clock analysis tool is the way for the hunter to quickly illustrate the best probability to determine what sensor location to hunt and at what time.

The Sensor List shows the best times, AM and PM, to hunt by a sensor by a selected date. The probability calculation of deer passing the sensor can only be predicted up to seven days in advance. The less number of days into the future will give the best quality prediction. The weather data used is dependent on the weather prediction for the location.

Deer Mapper past data is based on fact, events that were precisely measured. The prediction dependability will improve as more data is gathered. Beyond seven days DeerMapper 10 cannot be precisely predicted because there is not accurate indicator values available beyond that.

Here is a sample future prediction for all sensors 12 by day:

| Sensor List Sensor: All Scale: By Day Today: Wed Oct 21 When: Fri Oct 23 | | | | | | |
|---|---|---|---|---|---|---|
| | AM | | | PM | | |
| Sensor | Time | Probability | Deer Count | Time | Probability | Deer Count |
| Sensor A | 6:30 AM | 23% | 4 | 5:00 PM | 80% | 3 |
| Sensor B | 7:30 AM | 32% | 2 | 5:30 PM | 80% | 2 |
| Sensor C | 6:00 AM | 11% | 3 | 6:30 PM | 89% | 5 |
| Sensor D | 7:00 AM | 74% | 1 | 5:00 PM | 20% | 1 |
| Sensor E | 7:30 AM | 81% | 3 | 5:30 PM | 31% | 2 |

Using the above report the hunter would select a sensor, date and scale. If the date is in the future the system 10 looks up the forecast, compares it to the historical data to determine the percent and number of deer expected at each specified time.

The scale is by day, week or hour. If a week is selected the days will be divided by morning, mid-day, evening and night. If a day is selected it is divided by hour. If the hour is selected there will be three hours on the display divided by quarter hour periods.

Here is an example future prediction for one sensor by the hour:

| Sensor List Sensor: Sensor C Scale: By Hour When: Fri Oct 23 Today: Wed Oct 21 Forecast to match: Temperature: L42° H56° Humidity: 74% Dew Point: 40° Daylight 10:37 Wind 22 mph SE UV Index 2-low Moon Waxing gibbous, Visible: 79% ↑, Age: 10 days Precipitation: 20% Change: Wind +10 SW Change: Temperature +15 | | | | | |
|---|---|---|---|---|---|
| Time | Probability | Deer Count | Time | Probability | Deer Count |
| 12 AM | 1% | 0 | 12 PM | 1% | 0 |
| 1 AM | 1% | 0 | 1 PM | 1% | 0 |
| 2 AM | 1% | 0 | 2 PM | 1% | 0 |

-continued

Sensor ListSensor: Sensor C Scale: By Hour When: Fri Oct 23 Today: Wed Oct 21
Forecast to match: Temperature: L42° H56° Humidity: 74% Dew Point: 40° Daylight 10:37
Wind 22 mph SE UV Index 2-low Moon Waxing gibbous, Visible: 79% ↑, Age: 10 days
Precipitation: 20% Change: Wind +10 SW Change: Temperature +15

| Time | Probability | Deer Count | | Time | Probability | Deer Count | |
|---|---|---|---|---|---|---|---|
| 3 AM | 11% | 3 | | 3 PM | 1% | 0 | |
| 4 AM | 1% | 0 | | 4 PM | 1% | 1 | |
| 5 AM | 1% | 0 | | 5 PM | 56% | 5 | 5:55 sunrise |
| 6 AM | 9% | 3 | | 6 PM | 89% | 5 | |
| 7 AM | 12% | 3 | 7:17 sunset | 7 PM | 37% | 5 | |
| 8 AM | 8% | 3 | | 8 PM | 10% | 1 | |
| 9 AM | 1% | 0 | | 9 PM | 1% | 0 | |
| 10 AM | 1% | 0 | | 10 PM | 1% | 0 | |
| 11 AM | 1% | 0 | | 11 PM | 1% | 0 | |

User Experience

Sensor and Gateway Registration: When the user receives their kit they are required to register the kit with DeerMapper 10. To do this, they create an account on the DeerMapper website. Once logged in, they enter the serial number of the kit under their account.

This registration assures that the sensor setup, testing and data collection will only work with the sensors 12 and gateway 22 registered under that user account. If a sensor 12 or gateway 22 is stolen, it cannot be set up without the user account login that matches the registration. The registered user has access to DeerMapper technical support, repairs and exchange services. DeerMapper support service includes online access to the registered user's sensors 12, gateway 22 and database for maintenance only if the registered user allows access.

Gateway Location Determination: Gateway 22 is the first device (node) to be placed on location. Once it is in place, sensors 12 are placed within the range of gateway 22 or within range of a chaining of sensors 12 to gateway 22.

Gateway 22 may be placed at least one half mile from one of sensors 12. Sensors 12 are in a full mesh network 14 allowing the signal to pass through several sensors 12 to get to gateway 22. This style of network not only increases reliability but also increases range. Gateway 22 is not a sensor but can be placed outside if that is the only option. If a building with power and WIFI is within that range it is best to keep it indoors. Indoors, gateway 22 does not rely on batteries nor does the user need to use a cellular service. There is a monthly fee for the cellular service if the gateway 22 is used without access to WIFI.

The user can then leave the system set up without returning until after the season is over. The batteries are designed to run without interruption for one year. Extended batteries can be purchased that will last over one year. It is next to impossible for intruders to know that the system is present since sensors 12 are near to invisible with no sound or lights. The design is so that there is no human presence in the area to provide as natural of movements as possible.

Sensor Location Determination: As each sensor 12 is being placed, it is important for the user to check, by way of a PC, tablet or phone app 16, the RSSI (Received Signal Strength Indicator) and LQI (Link Quality Indicator) of sensors 12 and gateway 22 to show the current signal strength of each node on the network 14. This is especially valuable in hoping from sensor to sensor along the mesh network 14 to maximize range. Multi-hop can be tested live on location to assure no loss of signal strength and signal quality. Networks 14 do not limit the hops. With a solid ½ mile range ten hops could extend the range of the network to five miles.

To place a sensor, the user can see its signal strength and quality to gateway 22 to make sure it is not too far from the network 14 and has a weak or depleted signal. This is a continual read and as each sensor 12 is being placed the entire network can be tested for strength.

Where to place the sensors 12 can be as simple as wherever there has been a deer stand. It can also be as complex as understanding where the bedding, feeding, breeding and watering locations are, so as to place sensors 12 strategically along the travel and escape routes to and from each location.

The ideal number of sensors 12 to cover a forty acre area is ten with the least number being five. The system 10 can work with one sensor but is limited because deer do not travel the same route every day. Therefore, the system comes with the minimum recommended five sensors and the user can add packs of five sensors.

Sensors 12 can easily be moved from one location to another but this limits the accuracy of the sensor for two reasons. First, is that it reduces the volume of data, which limits the accuracy of the trends. Second, is that human presence will affect the natural deer movements for at least three days. The longer a sensor 12 is active the more dependable and consistent are the trends.

Deer trails 20 are generally one way trails. This means that the sensor can be placed with the sun at its back, when it is expected that the deer will use the trail, with the tree blocking the sun. This is not necessary, but if the sun is shining directly into the sensor it may reduce its effectiveness. The sensor should be placed between 20 and 30 feet from the trail. It is important to aim the sensor perpendicular and at three feet high to the trail. Sensors 12 come with camo covers that match the tree type and are not easy to see as they do not have any lights, buttons or moving parts. They are small, silent and visually blend into the bark of the tree.

Once set up, their detection zone 18 will be about 10-12 feet of the trail providing a dependable window to detect the movement. The user will start the DeerMapper phone app and walk down the trail into the detection zone 18. Once in the zone, the sensor will detect the user and send an event to the gateway 22. Gateway 22 will update the database which will be picked up by the mobile phone app 16. This is all the user needs to do to set up each sensor. Note that the mobile phone 16 will provide the sensor GPS position as to where the deer will be when detected, not by the sensor.

System Maintenance: The user can see the battery level of all of sensors 12 and gateway 22 at any time online. There is a table showing the battery levels of each device for each event to illustrate battery usage for each device. The batteries are designed to last for the full hunting season without a need to go on location to check the levels or change the batteries.

Each year, the user can bring the sensors to the dealer for a battery change or exchange for new sensors. It is important for DeerMapper 10 to always be up and the user not have problems.

From a PC, tablet or mobile phone 16 the user can change the transmission frequency from live to hourly, daily or as needed. Even in live mode, the battery will last the full season but the time can be extended even more by changing the transmission frequency to daily. During non-hunting days, it is sufficient for a daily transmission. To extend battery life even further the nodes will automatically enter sleep mode when there is inactivity.

The user can see the RSSI (Received Signal Strength Indicator) and LQI (Link Quality Indicator) of each node (sensors 12 and gateway 22) at any time by way of a PC, tablet or mobile phone 16. This is especially important at setup to get the strongest signal and maximum range of the mesh network 14.

The data analysis is by the recorded GPS location on trail 20 and not from sensor 12, as sensors 12 can be moved. The longer the user has a live sensor at a GPS location the stronger is the analysis. Each indicator has a separate file to adjust the size and intervals of the range of values. Also, for some indicators the values could be from a table maintainable by each indicator. The system comes with standard values but can be adjusted by the user.

Reports out of the database of events can be downloaded to Excel for further analysis.

Analysis: See the section "DeerMapper Analysis" for the user experience of Analysis.

Hunting: The trend of today's hunters is that they sit along trails waiting for deer instead of participating in organized deer drives. This style of hunting requires that the hunter pattern the deer to predict which trail gives them the best probability of success with minimum time on the stand. This provides an additional challenge for hunters whose land is too far away to scout with sufficient frequency to be able to predict the time and place to sit.

When a weekend hunter plans a hunt at a remote location they will first determine the hunt times, say Friday evening. They login to their data on DeerMapper 10 and select a new hunt. They will enter the time of the hunt and DeerMapper 10 will locate the sensors 12 with the highest probability of deer movement. If there are also trail camera photos the hunter can see the quality of the deer traveling past the sensor.

The hunter would then select the location and hunt there. The hunter can also better prepare for the hunt by scanning the 360 degree photo of the deer stand they had taken when they set up sensor 12.

With the present invention it is likely that the prediction will be so accurate that the hunter will know, within minutes, when the deer will come down the trail.

The hunter can keep the mobile phone 16 with them on the stand and see live movements occur in any of their sensors 12 while they are hunting. To do this it is important to first check the hunting laws in the area concerning electronics use on the hunt. The next morning hunt can be selected in the evening before the hunt. The closer the analysis to the hunt the better the prediction.

Gaming: See the section "Summary" and "Gaming" for the user experience of gaming.

Technology Currently Available in the Market

The wireless trail camera is used by many to obtain pictures of deer. The problems with this technology, which DeerMapper has overcome, include cost, warranty (repairs), battery life, RSSI (Received Signal Strength Indicator), LQI (Link Quality Indicator), camouflage (lights and size), security (stolen cameras), image storage capacity, accurate GPS, lack of data, no networking, no database, complex setup and low cellular signals.

There are four types of technology used by these camera companies listed here with example products of each technology.

1. There are Wireless Trail Cameras that use SIM cards to text pictures to a cell phone or email.
   - The purpose is to see a picture immediately without entering the woods.
   - The user will then name the picture, add documentation and copy it into an Image Handling System.
   - This process is manual and is not designed to automate the process at multiple location.
   - The pictures are not sent to a database for analysis with other picture events.
   - Wireless cameras are not cost effective for multiple locations.
   - Wireless cameras are not part of a network but are designed as a stand-alone.
   - Examples of these Type of Product:
   - SpyPoint Live Cameras are fully configurable online by way of mySPYPOINT
      - Mini (text, email), mini4G (4G cellular network (HSPA+) on the mySPYPOINT server),
      - Mini4GV (4G EV-DO cellular network),
   - Covert 3G Code Black
   - Bushnell Trophy Cam 3D wireless 2. Trail Camera Survey and Image Handling Systems are a common service provided by camera companies.
   - The hunter sees a deer and registers a sighting in the app, unfortunately human presence puts deer on alarm
   - Data gathering takes time, even when the picture is sent by way of text or email
   - The app does look up the weather data to the event but it is difficult for the user to know the exact time and GPS for the event as it is entered upon sighting.
   - The data is not automatically captured by way of multiple sensors 12, through a gateway 22 directly to the online database.
   - Examples of these Type of Product:
   - SPYPOINT Camera and photo Management System. Online organization of phots, keyword tagging, limited weather data (temperature, wind direction, moon phase) and statistics to predict hunts
   - Buck Advisor's Trail Camera Survey
   - Hunter's Club .com W.I.S.E
      - WISE is deer scouting and management software for your computer that syncs your trail camera images and your field observations with the weather and moon phase. It will suggest a stand for you to hunt based on the upcoming forecast.
   - DeerLAB Tracks specific deer across multiple cameras. They include some weather data but the main statistic is based off time.

3. Wireless sensors ping a remote receiver to alert the hunter of a passing deer This is against the law in many states where radio communications cannot be used to take deer (during a hunt).

Example in Minnesota, "Using walkie talkies, cell phones, remote control of other radio equipment to take big game or small game is unlawful."

This is a single event process and does not transmit multiple events to a database The DeerMapper 10 system protects the hunter by allowing them to remotely turn off the sensors during the hunt.

Sample Products:

SPYPOINT Motion Detection System—Up to 1,000 feet and requires a receiver.

Articles about the laws of using electronic devises to let a hunter know where a deer is during the hunt.

These laws are changing as new technologies like drones are available. States effected: CO, IA, MI, MN, MT, OH, SD, UT and WI.

The Pope & Young and Boone & Crockett view "fair chase hunting" cannot include the taking of animals, "by the use of electronic devices for attracting, locating or pursuing game or guiding the hunter to such game".

The DeerMapper app can easily turn off the sensors during the hunt so the hunter is not affected by these laws. The action of turning the sensors off is captured in the log to prove the hunter did not use electronic devices during their hunt. Even when the sensors are off they continue to collect events which will be uploaded to the database as soon as it is back on. This protects the hunter from breaking the law and not miss any movement events.

4. The camera can download pictures to a cell phone, or black box, hundreds of feet away with no SIM card.

The value is that it does not require SIM cards or monthly processing fees

If you have the cell phone and are hunting, this may be against the law.

Natural movements of deer within hundreds of feet of a person or a home accounts for a very small sample of deer movements. Therefore it provides a small sample of data for a property.

Sample Products:

Kodiak Series Trail Camera—The first trail camera that allowed you to download photos and videos to your smartphone from hundreds of feet away.

SPYPOINT TINY 4G—These cameras can all work with a BLACKBOX wireless backup system. Retrieve your photos while staying away from the monitored area. Can set up the black box to connect up to 10 cameras at 500 feet away to retrieve photos.

Problems of other systems overcome by the present invention include:

Using cameras to upload images—not sensor events.

Using a single device—not multiple sensors in a full mesh network 14.

Having no data enhancement process like factors, influences or triggers.

Not including a complete system or network that works together—sensor, gateway 22, database.

Not gathering data for the purpose to study deer movements.

Not tracking deer on a trail.

Not tracking deer movement but tracking deer when they come to a feeder.

Not having sufficient data nor data analysis to predict deer movements.

Using a single device that reads GPS, temperature, barometer then transmits it instead of transmitting the event. then looking up the data on the web to match the event.

Not moving data to a database for statistical analysis.

Not transmitting live deer data to a device on a deer stand—one issue is that is against the law.

Cannot determine RSSI (Received Signal Strength Indicator) and LQI (Link Quality Indicator) for the setup live on location to assure strong signal in unique environments.

Cannot capture live deer movements in remote areas where no cellular or WIFI is available. DeerMapper transmission frequency can be set to 'as needed' so the user can download, on location, the events directly to a mobile phone, tablet or PC.

Cannot capture live deer movements over large acreage, even miles, without human intervention.

Human data generation is inadequate so the wireless trail camera lacks data. The trail camera may provide a GPS location, but it represents the location of the camera, not the deer. The battery level, pixels, animal size, distance from camera, direction of travel and speed of travel are not included in a trail camera image. The cost of the camera is at least 10 times that of a sensor 12, and they are not practical for multiple locations.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An animal movement prediction method, comprising the steps of:
    establishing a wireless mesh network of a plurality of remote sensors not having a position location device, each of said sensors of the plurality of remote sensors being established in said wireless mesh network by the steps of:
        installing at least one of said sensors on an object to detect an animal in a detection zone;
        activating said sensors; and
        capturing a geographic coordinate in a mobile device for at least a portion of said detection zone apart from said sensor, the geographic coordinate not being the coordinate of said sensors;
    receiving animal detection information from said sensors by way of said mesh network, said animal detection information including at least a time of detection; and
    predicting future movements of a plurality of animals dependent upon said animal detection information.

2. The method of claim 1, wherein said animal detection information is incorporated into a snapshot of information.

3. The method of claim 2, wherein said snapshot of information further includes categories of information including additional information from said sensors, natural factors of the detection zone, calculated influences and action triggers.

4. The method of claim 2, wherein each time said receiving step receives said animal detection information each snapshot of information is generated and saved to a database.

5. The method of claim 4, wherein said predicting future movements step includes comparing said snapshots of information to predicted future environmental conditions.

6. The method of claim 5, wherein said predicting future movements step further includes using statistical analysis of said snapshots of information and the predicted future environmental conditions to predict a likelihood of an animal being in each detection zone during a predetermined time period.

7. The method of claim 1, wherein said sensors are passive infrared sensors.

8. An animal movement prediction method, comprising the steps of:
  establishing a wireless mesh network of a plurality of remote sensors not having a position location device, each of said sensors of the plurality of remote sensors being established in said wireless mesh network by the steps of:
    installing said sensors on an object to detect an animal in a detection zone;
    activating said sensors; and
    capturing a geographic coordinate in a mobile device for at least a portion of said detection zone apart from said sensor, the geographic coordinate not being the coordinate of said sensors;
  receiving animal detection information from said sensors by way of said mesh network, said animal detection information including at least a time of detection; and
  predicting future movements of a plurality of animals dependent upon said animal detection information, said animal detection information is incorporated into a snapshot of information, said snapshot of information further includes categories of information including additional information from said sensors, natural factors of the detection zone, calculated influences and action triggers, said snapshot of information still further includes current values of at least one of said animal detection information, said additional information from said sensors, said natural factors of the detection zone, said calculated influences and said action triggers.

9. The method of claim 8, wherein said snapshot of information further includes rate of change information of said current value for at least one of said animal detection information, said additional information from said sensor, said natural factors of the detection zone, said calculated influences and said action triggers.

10. The method of claim 8, wherein said snapshot of information includes said current values for each of said animal detection information, said additional information from said sensors, said natural factors of the detection zone, said calculated influences and said action triggers.

11. The method of claim 8, wherein said snapshot of information includes over 50 indicators relating to the categories of said animal detection information, said additional information from said sensors, said natural factors of the detection zone, said calculated influences and said action triggers.

12. The method of claim 11, wherein said indicators exceed 100.

13. An animal movement prediction method, comprising the steps of:
  receiving animal detection information from sensors, each reception defining an animal detection event, the sensors not having a position locating device;
  associating a plurality of indicators with the each reception of the animal detection event thereby creating a snapshot of information;
  saving said snapshot of information; and
  predicting future movements of a plurality of animals dependent upon said snapshot of information and predicting future environmental conditions.

14. The method of claim 13, wherein said snapshot of information further includes categories of information including additional information from said sensor, natural factors of the detection zone, calculated influences and action triggers.

15. The method of claim 13, wherein said sensors are passive infrared sensors.

16. An animal movement prediction method, comprising the steps of:
  receiving animal detection information from sensors not having a position location device, each reception defining an animal detection event;
  associating a plurality of indicators with the each reception of the animal detection event thereby creating a snapshot of information;
  saving said snapshot of information; and
  predicting future movements of a plurality of animals dependent upon said snapshot of information and predicted future environmental conditions, said snapshot of information includes categories of information including additional information from said sensors, natural factors of the detection zone, calculated influences and action triggers, said snapshot of information further includes current values of at least one of said animal detection information, said additional information from said sensors, said natural factors of the detection zone, said calculated influences and said action triggers.

17. The method of claim 16, wherein said snapshot of information further includes rate of change information of said current value for at least one of said animal detection information, said additional information from said sensors, said natural factors of the detection zone, said calculated influences and said action triggers.

18. The method of claim 16, wherein said snapshot of information includes said current values for the each reception of said animal detection information, said additional information from said sensors, said natural factors of the detection zone, said calculated influences and said action triggers.

19. The method of claim 16, wherein said snapshot of information includes over 50 indicators relating to the categories of said animal detection information, said additional information from said sensors, said natural factors of the detection zone, said calculated influences and said action triggers.

20. The method of claim 19, wherein said indicators exceed 100.

* * * * *